(12) United States Patent
Shimo et al.

(10) Patent No.: US 9,066,315 B2
(45) Date of Patent: Jun. 23, 2015

(54) INFORMATION PROCESSING APPARATUS, COMMUNICATION SYSTEM, AND INFORMATION PROCESSING METHOD

(71) Applicant: Sony Corporation, Tokyo (JP)

(72) Inventors: Norio Shimo, Kanagawa (JP); Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 13/938,370

(22) Filed: Jul. 10, 2013

(65) Prior Publication Data

US 2014/0024399 A1 Jan. 23, 2014

(30) Foreign Application Priority Data

Jul. 17, 2012 (JP) ................. 2012-158264

(51) Int. Cl.
*H04W 24/00* (2009.01)
*H04W 64/00* (2009.01)
*H04W 16/18* (2009.01)
*H04W 4/20* (2009.01)
*H04W 4/02* (2009.01)

(52) U.S. Cl.
CPC ............ *H04W 64/006* (2013.01); *H04W 16/18* (2013.01); *H04W 4/206* (2013.01); *H04W 4/028* (2013.01)

(58) Field of Classification Search
USPC ........................................ 455/457
See application file for complete search history.

(56) References Cited

U.S. PATENT DOCUMENTS

| | | | | |
|---|---|---|---|---|
| 5,164,904 A | * | 11/1992 | Sumner | 701/117 |
| 6,006,161 A | * | 12/1999 | Katou | 701/410 |
| 2006/0064236 A1 | * | 3/2006 | Hayashi | 701/117 |
| 2006/0104232 A1 | * | 5/2006 | Gidwani | 370/328 |
| 2008/0212482 A1 | * | 9/2008 | Nakayma et al. | 370/237 |
| 2014/0006096 A1 | * | 1/2014 | Groarke | 705/7.29 |

FOREIGN PATENT DOCUMENTS

JP 2009-098446 A 5/2009

* cited by examiner

*Primary Examiner* — Joel Ajayi
(74) *Attorney, Agent, or Firm* — Hazuki International, LLC

(57) ABSTRACT

An information processing apparatus includes a receiver configured to receive designation information corresponding to a user operation for designating an area for which an index indicating a degree of human congestion is to be displayed and a controller configured to perform control to provide a degree of communication traffic in the area as the index for the area.

12 Claims, 27 Drawing Sheets

AVERAGING OF CONGESTION DEGREES

| TIMESTAMP | EQUIPMENT ID | BASE-STATION ID | POSITION INFORMATION | CONGESTION DEGREE (Kcong) | ... |
|---|---|---|---|---|---|
| 02.10.2012 10.10 | 12345 | 201 | LATITUDE: ○° ○' LONGITUDE: ○° △' | 0.15 | ... |
| 02.10.2012 10.11 | 11211 | 303 | LATITUDE: ○° □' LONGITUDE: ○° ○' | 0.25 | ... |
| 02.10.2012 10.20 | 12345 | 201 | LATITUDE: △° ○' LONGITUDE: □° ○' | 0.20 | ... |
| ⋮ | ⋮ | ⋮ | ⋮ | ⋮ | ... |

| | FIRST COMMUNICATION SERVICE PROVIDER | | | | SECOND COMMUNICATION SERVICE PROVIDER | | | |
|---|---|---|---|---|---|---|---|---|
| DATE AND TIME (341) | BASE-STATION ID (342) | POSITION INFORMATION (343) | CONGESTION DEGREE (344) | DATE AND TIME (341) | BASE-STATION ID (342) | POSITION INFORMATION (343) | CONGESTION DEGREE (344) | |
| 02.15.2012 14.15 | 145 | LATITUDE:○°○' LONGITUDE:○°△' | 0.21 | 02.17.2012 14.15 | 654 | LATITUDE:□°□' LONGITUDE:○°△' | 0.17 | ⋮ |
| 02.10.2012 14.16 | 234 | LATITUDE:○°□' LONGITUDE:○°○' | 0.25 | 02.17.2012 14.16 | 567 | LATITUDE:□°□' LONGITUDE:○°○' | 0.23 | ⋮ |
| 02.10.2012 14.18 | 657 | LATITUDE:△°○' LONGITUDE:□°○' | 0.16 | 02.17.2012 14.18 | 342 | LATITUDE:▽°○' LONGITUDE:□°○' | 0.27 | ⋮ |
| ⋯ | ⋯ | ⋯ | ⋯ | ⋯ | ⋯ | ⋯ | ⋯ | ⋮ |

INSTALL ADDITIONAL BASE STATIONS IN VICINITY OF STATION

INFORMATION PROCESSING APPARATUS, COMMUNICATION SYSTEM, AND INFORMATION PROCESSING METHOD

BACKGROUND

The present technology relates to information processing apparatuses. More specifically, the present technology relates to an information processing apparatus, a communication system, and an information processing method for handling information regarding wireless communication.

Data (congestion-degree data) indicating the degrees of congestion regarding railroads, roads, tourist sites, and so on is often used as important information. There is also a proposed system that collects and analyzes the congestion-degree data and that provides a result of the analysis.

For example, an information providing system has been proposed that obtains current position information transmitted from multiple terminal apparatuses to determine an approximate number of people gathering at each position and transmits information (aggregation information) regarding the place where people gather to the terminal apparatuses (see, for example, Japanese Unexamined Patent Application Publication No. 2009-98446).

SUMMARY

In the related art described above, users can easily obtain the information (aggregation information) regarding the place where people gather.

However, when aggregation information is supplied to the users as in the related art, it is important to consider the privacy of the individuals who are registered with the service. The users may also desire to know the degree of human congestion (which may herein be referred to as "human congestion degree" as appropriate) in a place other than a place where people gather.

The present technology has been made in view of such a situation and it is desirable to appropriately provide a human congestion degree.

The present technology has been made in order to overcome the foregoing problem, and a first embodiment of the present technology provides an information processing apparatus that includes a receiver configured to receive designation information corresponding to a user operation for designating an area for which an index indicating a degree of human congestion is to be displayed and a controller configured to perform control to provide a degree of communication traffic in the area as the index for the area. The first embodiment also provides an information processing method for the information processing apparatus and a program for causing a computer to execute the method. This arrangement provides an advantage in that, upon reception of the designation information, the degree of communication-traffic congestion in the area can be provided as the index (indicating a human congestion degree) in the area.

In the first embodiment, the receiver may receive the designation information regarding the area determined by a designation operation by which a user designates a position and a range on a map displayed on a display of a wireless communication apparatus, and the information processing apparatus may further include a determiner configured to extract at least one base station located in the area and determine the degree of communication-traffic congestion in the area on the basis of a communication-traffic congestion degree regarding the extracted base station. This arrangement provides an advantage in that at least one base station present in the area can be extracted and the degree of communication-traffic congestion in the area can be determined on the basis of the communication-traffic congestion degree(s) regarding the at least one extracted base station.

In the first embodiment, the determiner may use a communication-traffic congestion degree obtained by at least one wireless communication apparatus present in the area as the communication-traffic congestion degree regarding the extracted base station. This arrangement provides an advantage in that the communication-traffic congestion degree(s) obtained by the at least one wireless communication apparatus present in the area can be used as the communication-traffic congestion degree(s) regarding the at least one extracted base station.

In the first embodiment, the determiner may determine the degree of communication-traffic congestion in the area by averaging the communication-traffic congestion degrees obtained by the at least one wireless communication apparatus present in the area. This arrangement provides an advantage in that the degree of communication-traffic congestion in the area can be determined by averaging the communication-traffic congestion degrees obtained by the at least one wireless communication apparatus present in the area.

In the first embodiment, the determiner may aggregate, at predetermined intervals, the communication-traffic congestion degrees obtained by the at least one wireless communication apparatus present in the area, to determine at least one of a degree of current communication-traffic congestion in the area and a degree of communication-traffic congestion in the past in the area. This arrangement provides an advantage in at least one of a degree of current communication-traffic congestion in the area and a degree of communication-traffic congestion in the past in the area can be determined by aggregating, at predetermined intervals, the communication-traffic congestion degrees obtained by the at least one wireless communication apparatus present in the area.

In the first embodiment, the determiner may determine a ratio of the degree of current communication-traffic congestion in the area to the degree of communication-traffic congestion in the past in the area as the index for the area. This arrangement provides an advantage in that a ratio of the degree of current communication-traffic congestion in the area to the degree of communication-traffic congestion in the past in the area can be determined as the index for the area.

in the first embodiment, the determiner may determine a ratio of the degree of communication-traffic congestion at one time point in the past in the area to the degree of communication-traffic congestion at another time point in the past in the area as the index for the area. This arrangement provides an advantage in that a ratio of the degree of communication-traffic congestion at one time point in the past in the area to the degree of communication-traffic congestion at another time point in the past in the area can be determined as the index for the area.

In the first embodiment, the designation information may include date-and-time information, and the controller may perform control to provide, as the index for the area, the degree of communication-traffic congestion in the area in a period specified by the date-and-time information. This arrangement provides an advantage in that the degree of communication-traffic congestion in the area in a period specified by the date-and-time information can be provided as the index for the area.

In the first embodiment, the controller may perform control to cause at least one of the degree of communication-traffic congestion in the area and a sign indicating the degree of communication-traffic congestion to be displayed on the display as the index for the area. This arrangement provides an advantage in that at least one of the degree of communication-traffic congestion in the area and a sign indicating the degree of communication-traffic congestion can be displayed as the index for the area.

In the first embodiment, the controller may perform control to cause at least one of the degree of communication-traffic congestion in the area and a sign indicating the degree of communication-traffic congestion to be displayed on the display in association with a map including the area. This arrangement provides an advantage in that at least one of the degree of communication-traffic congestion in the area and a sign indicating the degree of communication-traffic congestion can be displayed in association with a map including the area.

In the first embodiment, the controller may perform control to cause at least one of the degree of communication-traffic congestion in the area and a sign indicating the degree of communication-traffic congestion to be displayed on the display in a superimposed manner on the map. This arrangement provides an advantage in that at least one of the degree of communication-traffic congestion in the area and a sign indicating the degree of communication-traffic congestion can be displayed superimposed on the map.

A second embodiment of the present technology provides a communication system that includes: a wireless communication apparatus configured to transmit, on the basis of a user operation for designating an area for which an index indicating a degree of human congestion is to be displayed, designation information regarding the area to an information processing apparatus; and an information processing apparatus that includes a receiver that receives the designation information and a controller that performs control to cause the wireless communication apparatus to display a degree of communication-traffic congestion in the area as the index for the area. The second embodiment also provides a processing method for the communication system and a program for causing a computer to execute the processing method. This arrangement provides an advantage in that, upon reception of the designation information from the wireless communication apparatus, the degree of communication-traffic congestion in the area can be displayed on the wireless communication apparatus as the index (indicating a human congestion degree) in the area.

The present technology offers an advantage in that human congestion degrees can be appropriately provided.

BRIEF DESCRIPTION OF THE DRAWINGS

FIG. 6 is a table schematically illustrating an example of contents stored in a terminal-information storage in the first embodiment of the present technology;

FIG. 7 is a table schematically illustrating one example of contents stored in a congestion-degree information storage in the first embodiment of the present technology;

DETAILED DESCRIPTION OF EMBODIMENTS

A description below will be given of modes (hereinafter referred to as "embodiments") for implementing the present technology.

The description will be given in the following order.

1. First Embodiment of Present Technology (Congestion-Degree Information Providing Control: an example of providing congestion-degree information regarding an area designated by a user)

2. Second Embodiment of Present Technology (Congestion-Degree Information Providing Control: an example of displaying congestion-degree information, such as the ratio of a congestion degree to a previous day's congestion degree and the ratio of a congestion degree to a previous week's congestion degree, on a map in a superimposed manner)

1. First Embodiment of Present Technology

[Example of Configuration of Communication System]

Figure 1:
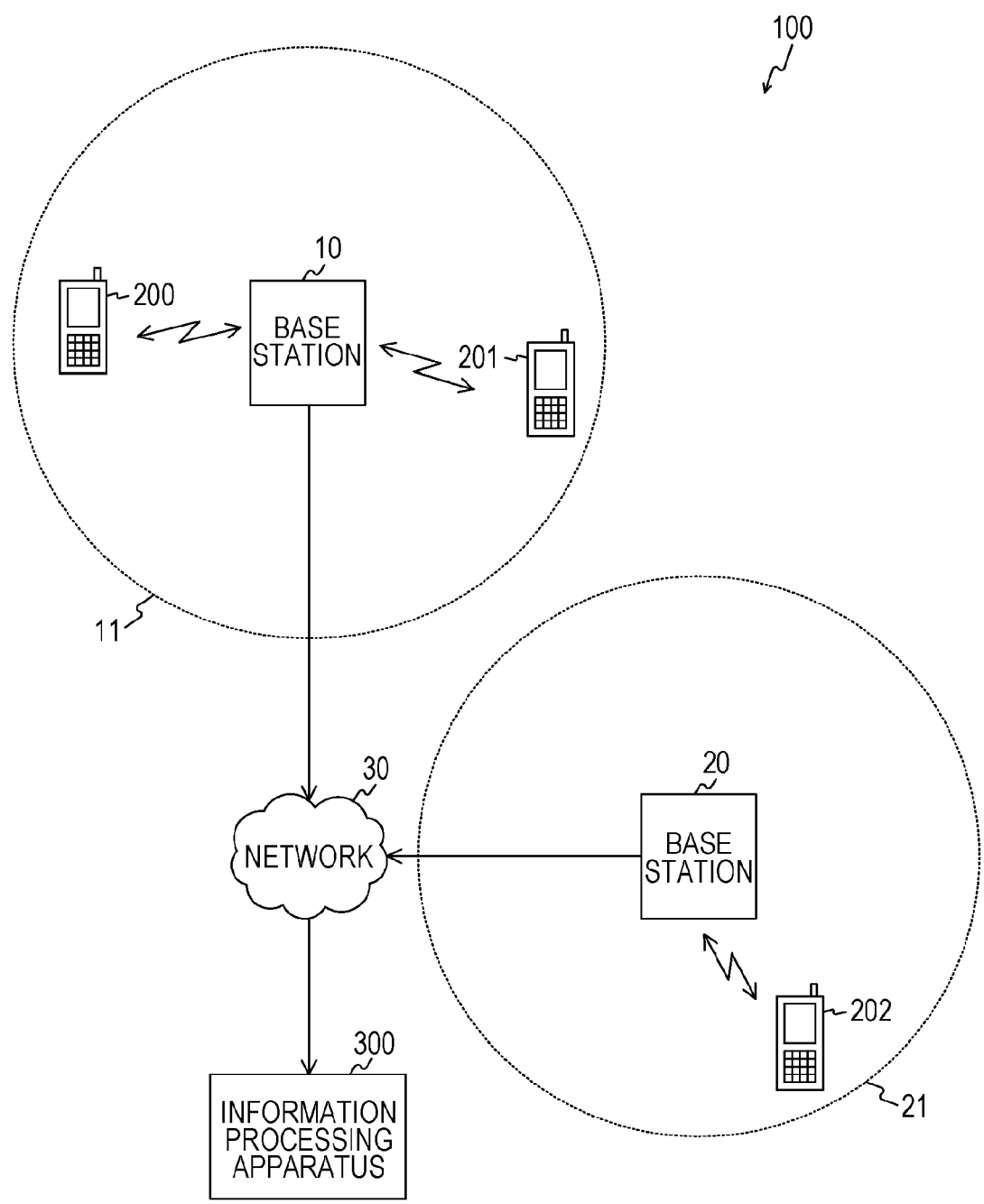
FIG. 1 illustrates an example of the system configuration of a communication system according to a first embodiment of the present technology.

FIG. 1 illustrates an example of the system configuration of a communication system 100 according to a first embodiment of the present technology.

The communication system 100 includes base stations 10 and 20, a network 30, wireless communication apparatuses 200 to 202, and an information processing apparatus 300.

Each of the base stations 10 and 20 may be a mobile-communication base station (e.g., NodeB or eNodeB) operated by a communication service provider that provides wireless communication services. For example, each of the base stations 10 and 20 provides, through a radio channel, a connection between the wireless communication apparatus that holds contract authentication information for the corresponding communication service provider and a communication control apparatus (not illustrated) operated by the communication service provider. The contract authentication information is, for example, a universal subscriber identity module (USIM). The base stations 10 and 20 may be operated by the same communication service provider or may be operated by different communication service providers.

For example, each of the base stations 10 and 20 relays data, received from the wireless communication apparatus 200, to a destination and transmits, upon receiving data addressed to the wireless communication apparatus 200, the received data to the wireless communication apparatus 200. FIG. 1 illustrates an example in which the wireless communication apparatuses 200 and 201 are present in a cell 11 of the base station 10 and the wireless communication apparatus 202 is present in a cell 21 of the base station 20. Thus, the base station 10 controls communications performed by the wireless communication apparatuses 200 and 201 and the base station 20 controls a communication performed by the wireless communication apparatus 202.

Each of the base stations 10 and 20 can communicate with the wireless communication apparatus 200 by using wireless multiple access, such as Orthogonal Frequency Division Multiple Access (OFDMA), Time Division Multiple Access (TDMA), or Code Division Multiple Access (CDMA). Now, CDMA will be briefly described.

In CDMA, for example, in a W-CDMA system, which is one type of mobile-phone system, 512 types of scrambling code are defined and any of the types is allocated to each base station. Each base station spreads the spectrum of a transmission signal with an orthogonal spreading code (e.g., a channelization code) according to the type of transmission signal and the wireless communication apparatus, further spreads the spectrum of the spectrum-spread code with the assigned scrambling code, and transmits the resulting code. Examples of types of the transmission signal include a common pilot channel (CPICH) and a primary common control physical channel (P-CPICH). Further examples of types of the transmission signal include a dedicated physical channel (DPCH) and a synchronization channel (SCH).

The SCH includes a primary SCH and a secondary SCH. The primary SCH and the secondary SCH are placed in the front end of each of 15 slots constituting one frame. The primary SCH is spread with a primary synchronization code ($C_{PSC}$) and the secondary SCH is spread with a secondary synchronization code ($C_{SSC}$).

There are 16 types of $C_{SSC}$ and 64 combination patterns therefor are prepared for assignment to 15 slots. Any of the 64 combination patterns is assigned to each base station. Each base station spreads the spectrum of the secondary SCH in each slot in accordance with the assigned pattern. Also, 512 types of scrambling code are divided into 64 groups, and any of the 64 combination patterns for $C_{SSC}$ is associated with each of the groups.

Each of the base stations 10 and 20 may be any various types of base station. Examples of each base station include a macrocell base station or a microcell base station (NodeB or eNodeB), a relay node that relays a communication between a macrocell base station and a wireless communication apparatus, and a home small base station (femto-cell (Home eNodeB)).

The network 30 is a phone network or a network (e.g., a public network) such as the Internet. The network 30 and a communication control apparatus (e.g., the communication control apparatus connected to the base station 10 or 20) operated by a communication service provider are connected to each other through a gateway (not illustrated).

The wireless communication apparatuses 200 to 202 communicate various types of information with other apparatuses through the corresponding base stations 10 and 20. The various types of information communicated between the wireless communication apparatus 200 and other apparatuses are, for example, various types of content. Examples of the content include music data, video data, games, and software. Examples of the music data include data of music, lectures, radio programs, and so on and examples of the video data include data of movies, television programs, video programs, photographs, documents, web pages, paintings, figures, tables, and so on. Examples of the wireless communication apparatuses 200 to 202 include mobile phone apparatuses (e.g., smart phones and mobile phone apparatuses having phone-call functions and data-communication functions) and data communication apparatuses (e.g., personal computers) having wireless communication functions. Although a description below will mainly be given of the wireless communication apparatus 200, the same description may also apply to the wireless communication apparatuses 201 and 202.

Each of the wireless communication apparatuses 200 to 202 may be an information processing apparatus connected to or integrated into, for example, a personal computer (PC) or a personal digital assistant (PDA). Each of the wireless communication apparatuses 200 to 202 may be an information processing apparatus connected to or integrated into a home video processing apparatus (a digital versatile disc (DVD) recorder, a video cassette recorder, or the like), home game equipment, household electrical and electronic equipment, or the like. Each of the wireless communication apparatuses 200 to 202 may further be a personal handyphone system (PHS), a portable music playback apparatus, a portable video-processing apparatus, or an information processing apparatus connected to or integrated into a portable video-processing apparatus or the like.

The information processing apparatus 300 is operated by a business operator that provides various communication services. The information processing apparatus 300 obtains and manages communication-traffic congestion degrees obtained by the wireless communication apparatuses 200 to 202 and supplies the managed congestion-degree information to the wireless communication apparatuses 200 to 202. In this case, the business operator that provides the communication services may be a communication service provider that provides wireless connection services, a mobile virtual network operator (MVNO, which is a business operator having a business form that is a so-called "virtual communication service provider"), or the like. The information processing apparatus 300 will be described later in detail with reference to FIG. 5.

Now, suppose a case in which the degree of human congestion (a crowd congestion degree) in one area is presented to a user. In this case, for example, it is conceivable to employ an arrangement in which location data of global positioning systems (GPSs) and so on are transmitted from multiple wireless communication apparatuses to an information processing apparatus (e.g., a server) and the number of people in a crowd in the area and a congestion degree for the area, the number and the congestion degree being based on an aggregation result of multiple pieces of position information, are supplied from the information processing apparatus to the wireless communication apparatuses. In such a case, however, in order to determine the number of people in a crowd or the congestion degree, it is important to consider the privacy of the individuals who have wireless communication apparatuses for transmitting the location data of the GPSs and so on.

Accordingly, for example, it is conceivable to employ an arrangement in which the number of passers-by is surveyed using a counter or the amount of carbon dioxide released from people or the amount of noise, such as voice of speech or sound of footsteps, is measured, and the degree of congestion of a crowd in that area is estimated based on a result of the survey or measurement. However, it is difficult to conduct such survey and measurement in a wide range. Wireless communication apparatuses, such as terminals having mobile-phone and data-communication functions, have been put to widespread use. Accordingly, it is also possible to measure the amount of spatially communicated data released by people and to convert the amounts into a crowd congestion degree. Accordingly, the embodiment of the present technology is directed to an example in which the degree of communication-traffic congestion in one area is provided as an index indicating the degree of human congestion in the area.

[Example of Configuration of Wireless Communication Apparatus]

Figure 2:
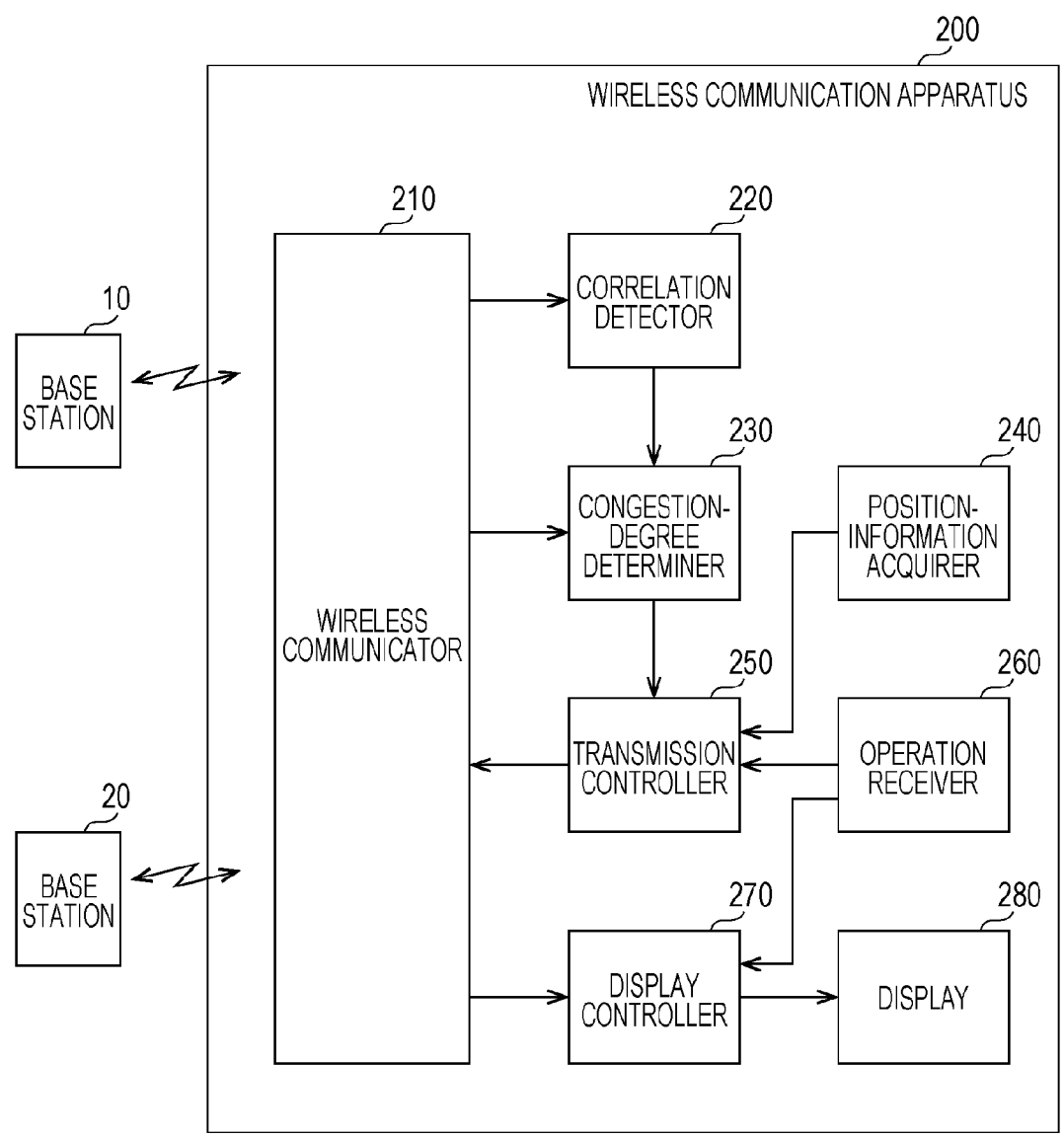
FIG. 2 is a block diagram illustrating an example of the functional configuration of a wireless communication apparatus according to the first embodiment of the present technology.

FIG. 2 is a block diagram illustrating an example of the functional configuration of the wireless communication apparatus 200 according to the first embodiment of the present technology.

The wireless communication apparatus 200 includes a wireless communicator 210, a correlation detector 220, a congestion-degree determiner 230, a position-information acquirer 240, a transmission controller 250, an operation receiver 260, a display controller 270, and a display 280.

The wireless communicator 210 is a communicator for one or more wireless communication services. The wireless communicator 210 has a function of a receiving unit for receiving radio signals transmitted from the corresponding base station 10 and 20, which provide corresponding wireless communication services, and a function of a transmitting unit for transmitting radio signals to the base station 10 and 20. The wireless communicator 210 is capable of performing communication in accordance with, for example, CDMA or OFDMA.

When a wireless communication service using CDMA is to be provided, the correlation detector 220 detects correlations between a signal received by the wireless communicator 210 and scrambling codes. The correlation detector 220 then supplies resulting correlation outputs $c_1$ to $c_n$ of the respective scrambling codes to the congestion-degree determiner 230.

For example, the correlation detector 220 performs correlation detection called three-step cell search. The correlation detector 220 uses the three-step cell search to identify a scrambling code having the highest correlation output (i.e., a base station having the lowest propagation loss). A description below will be given of the three-step cell search.

The correlation detector 220 detects a correlation between a received signal and $C_{PSC}$ to detect the reception timing of the primary SCH (a first step). Subsequently, using the primary-SCH reception timing detected in the first step, the correlation detector 220 detects, of 64 combination patterns for $C_{SSC}$, the pattern having the highest correlation with the received signal (a second step). As a result of the detection, a scrambling code group is identified and synchronization for each frame is ensured. After the second step, the correlation detector 220 detects a correlation between the received signal and each of eight scrambling codes, included in the identified scrambling code group, to identify the scrambling code having the highest correlation output (a third step).

Although the three-step cell search has been described in this example as one example of detection of correlations between the received signal and the scrambling codes, the correlation detection performed by the correlation detector 220 is not limited to the three-step cell search and may be other correlation detection.

For example, when the wireless communication apparatus 200 is powered off, information of scrambling codes regarding a serving cell of the wireless communication apparatus 200 and its peripheral cells is stored in the wireless communication apparatus 200. Thus, during startup of the wireless communication apparatus 200, the correlation detector 220 may detect correlations between a received signal and the stored scrambling codes. When information regarding a scrambling code of a peripheral cell is obtained from broadcast information of the serving cell, the correlation detector 220 may detect a correlation between a received signal and the scrambling code of the peripheral cell.

The congestion-degree determiner 230 determines the traffic congestion degree of the base station 10 or 20 that provides an intended wireless communication service, on the basis of a radio signal received by the wireless communicator 210 or the scrambling-code correlation values supplied from the correlation detector 220. In this case, a description will be given of a method for determining the congestion degree of a wireless communication service using CDMA and a method for determining the congestion degree of a wireless communication service using OFDMA. However, a congestion-degree determination method described below is one example, and another congestion-degree determination method is also applicable to the first embodiment of the present technology.

[Example of Determination of Congestion Degree of Wireless Communication Service Using CDMA]

First, a description will be given of an example of determining a congestion degree of a wireless communication service using CDMA. When the number of DPCHs to be multiplexed (i.e., the number of wireless communication apparatuses belonging to the base station) increases, the correlation outputs of scrambling codes are increased by not a small amount although the DPCHs are spread. Similarly, in a wireless communication service using CDMA, when the number of HS-DSCHs increases, the correlation outputs of scrambling codes are increased by not a small amount although the HS-DSCHs are spread. The number of HS-DSCHs corresponds to the number of high-speed downlink channels shared by multiple wireless communication apparatuses in the HSDPA. Now, the highest correlation output of a scrambling code is represented by a, and, of the correlation outputs of the other scrambling codes, the smallest correlation output is represented by b. In this case, "correlation output b"/"correlation output a" is deemed to increase, as the number of wireless communication apparatuses increases and the available capacity decreases or as the amount of interference increases.

Accordingly, the congestion-degree determiner 230 determines the ratio of the correlation output b to the correlation output a as a congestion degree $k_{cong}$ of the wireless communication service using CDMA, as noted in equation (1) below. The lowest correlation output b may also be replaced with the value of a total received electric power (a received signal strength indicator (RSSI)) or a value obtained by dividing the RSSI by a spreading rate.

$$k_{cong}=b/a \quad (1)$$

[Example of Determining Congestion Degree of Wireless Communication Service Using OFDMA]

Next, a description will be given of an example of determining a congestion degree for a wireless communication service using OFDMA. Subcarrier allocation information for each frame is transmitted from the wireless communication service using OFDMA as one type of control information. In Mobile WiMAX, subcarrier allocation information called downlink map (DL-MAP) is transmitted.

Accordingly, on the basis of the subcarrier allocation information received by the wireless communicator 210, the congestion-degree determiner 230 determines, as the congestion degree $k_{cong}$, the ratio of the number of subcarriers already allocated to each wireless communication apparatus to the total number of subcarriers for each frame.

In this case, suppose a case in which the wireless communication apparatus 200 runs an application that mainly uses uplink resources. In this case, the congestion-degree determiner 230 may determine, as the congestion degree $k_{cong}$, the ratio of the number of subcarriers already assigned to each wireless communication apparatus to the total number of uplink subcarriers. The congestion-degree determiner 230 may also determine an average value of a downlink congestion degree $k_{cong}$ and an uplink congestion degree $k_{cong}$ as the congestion degree $k_{cong}$ for the wireless communication service.

In Long Term Evolution (LTE) using OFDMA for downlink communication, scheduling-control information including downlink resource allocation and uplink scheduling information is reported to the wireless communication apparatus 200, as in the case of WiMAX. In this case, a downlink control signal (Physical Downlink Control CHannel (PDCCH)) is used to report the scheduling-control information to the wireless communication apparatus 200. The PDCCH is placed in the first n OFDM symbols (n≤3) of each downlink subframe. Thus, the congestion-degree determiner 230 may be configured to determine, as the congestion degree $k_{cong}$, the ratio of the number of subcarriers allocated to each wireless communication apparatus to the total number of subcarriers for each frame. That is, the congestion-degree determiner 230 may be configured to receive the first n OFDM symbols, obtain information of allocation of resources to each wireless communication apparatus, and determine, as the congestion degree $k_{cong}$, the ratio of the number of subcarriers assigned to each wireless communication apparatus to the total number of subcarriers for each frame.

[Example of Configuration of Wireless Communication Apparatus]

The position-information acquirer 240 acquires information (position information) regarding the position at which the wireless communication apparatus 200 is present (i.e., the position in the service area) and outputs the acquired position information to the transmission controller 250. The position-information acquirer 240 is implemented by, for example, a GPS receiver that receives a GPS signal and determines a latitude, a longitude, and an altitude. The position-information acquirer 240 may also acquire, from another information processing apparatus (e.g., a server operated by a communication service provider relevant to the contract authentication information), information (position information) regarding the base station or regarding a position corresponding to the identification information of an access point.

The transmission controller 250 performs control for transmitting information regarding the congestion degree (i.e., congestion-degree information), determined by the congestion-degree determiner 230, to the information processing apparatus 300 via the wireless communicator 210. The congestion-degree information includes an equipment identifier (ID), a base-station ID, position information (acquired by the position-information acquirer 240), and so on. When the operation receiver 260 receives an operation input for transmitting a congestion-degree-information acquire request, the transmission controller 250 performs control for transmitting the congestion-degree-information acquire request to the information processing apparatus 300. The congestion-degree-information acquire request includes information regarding a position and date and time received by the operation receiver 260.

The operation receiver 260 receives an operation input operated by the user and outputs, to the transmission controller 250 and the display controller 270, a signal corresponding to the received operation input. The operation receiver 260 includes, for example, various keys, such as numeric keys and alphabet keys. The operation receiver 260 and the display 280 may also be integrally configured using a touch panel that allows the user to perform an operation input by touching the display surface thereof with his or her finger or bringing his or her finger close thereto. Those operations are described later in detail with reference to FIG. 11 and so on.

The display controller 270 causes a display screen to be displayed on the display 280. For example, the display controller 270 obtains the congestion-degree information transmitted from the information processing apparatus 300 via the wireless communicator 210 and causes the congestion-degree information to be displayed on the display 280.

Under the control of the display controller 270, the display 280 displays various types of information. The display 280 may employ a display panel, such as an organic electroluminescent (EL) panel or a liquid crystal display (LCD) panel. As described above, the operation receiver 260 and the display 280 may be integrally configured using a touch panel.

[Example of Determining Average Value of Congestion Degrees]

Figure 3A:
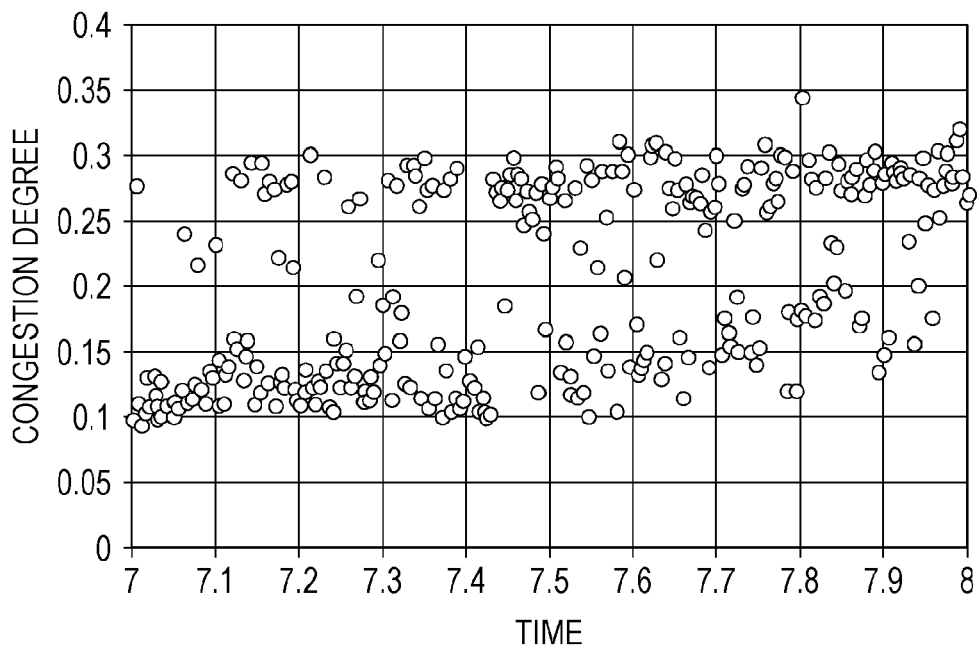
FIGS. 3A and 3B schematically illustrate a method for determining an average value of congestion degrees, the determination being performed by the congestion-degree determiner in the first embodiment of the present technology.
Figure 3B:
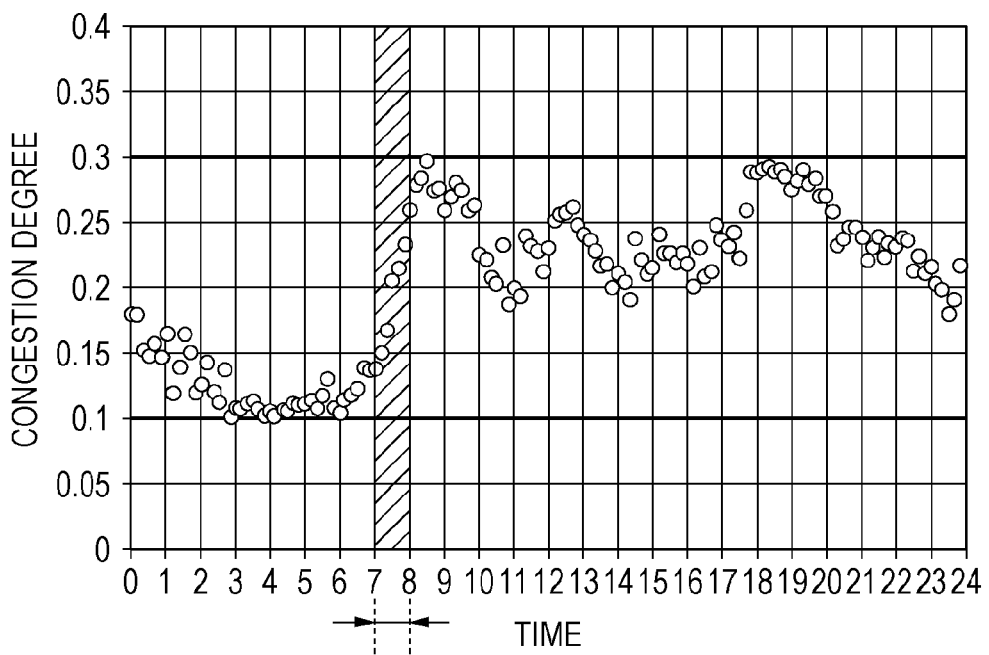

FIGS. 3A and 3B schematically illustrate a method for determining an average value of congestion degrees, the determination being performed by the congestion-degree determiner 230 in the first embodiment of the present technology. FIGS. 3A and 3B illustrate an example in which congestion degrees are determined for every 12 seconds and an average value of the determined congestion degrees for every 10 minutes is determined.

In FIG. 3A, congestion degrees determined by the congestion-degree determiner 230 in a predetermined time slot (7:00 to 8:00) are illustrated in a time sequence. In the graph illustrated in FIG. 3A, the horizontal axis indicates a time axis and the vertical axis indicates numeric values (0.0 to 0.4) representing congestion degrees. In the graph illustrated in FIG. 3A, numeric values corresponding to the congestion degrees determined by the congestion-degree determiner 230 are represented by white circles.

As illustrated in FIG. 3A, the density of the congestion degrees determined by the congestion-degree determiner 230 changes by a certain amount, depending on the time slot. Although it is possible to grasp the changes by viewing the graphs illustrated in FIGS. 3A and 3B, it is difficult to grasp the changes by using the numeric values. Accordingly, the data of the congestion degrees are averaged so that it is easier to grasp the congestion degrees.

In FIG. 3B, an average value determined for the data illustrated in FIG. 3A is illustrated in a time sequence. FIG. 3B illustrates an example in which an average value of the congestion degrees for every 10 minutes is determined. In the graph illustrated in FIG. 3B, the horizontal axis indicates a time axis and the vertical axis indicates an average value determined with respect to numeric values (0.0 to 0.4) representing the congestion degrees. In the graph illustrated in FIG. 3B, each average value determined by the congestion-degree determiner 230 is represented by a white circle.

The congestion degrees illustrated in FIG. 3A correspond to the time slot "7:00 to 8:00" (indicated by arrows) illustrated in FIG. 3B.

For example, when the average values for every 10 minutes are determined, it is possible to clearly grasp the state in which the congestion degree increases gradually in the time slot "7:00 to 8:00", as illustrated in FIG. 3B. Since the congestion-degree determiner 230 determines the average values in the manner described above, it is possible to clearly grasp the congestion degrees.

The average values of the congestion degrees are sequentially transmitted to the information processing apparatus 300. For example, the average values of congestion degrees are determined for every 10 minutes, are transmitted to the information processing apparatus 300, and are managed by the information processing apparatus 300. For example, the average values are stored as congestion degrees 344 in a congestion-degree information storage 340 (illustrated in FIG. 7).

[Example of Operation of Wireless Communication Apparatus]

Figure 4:
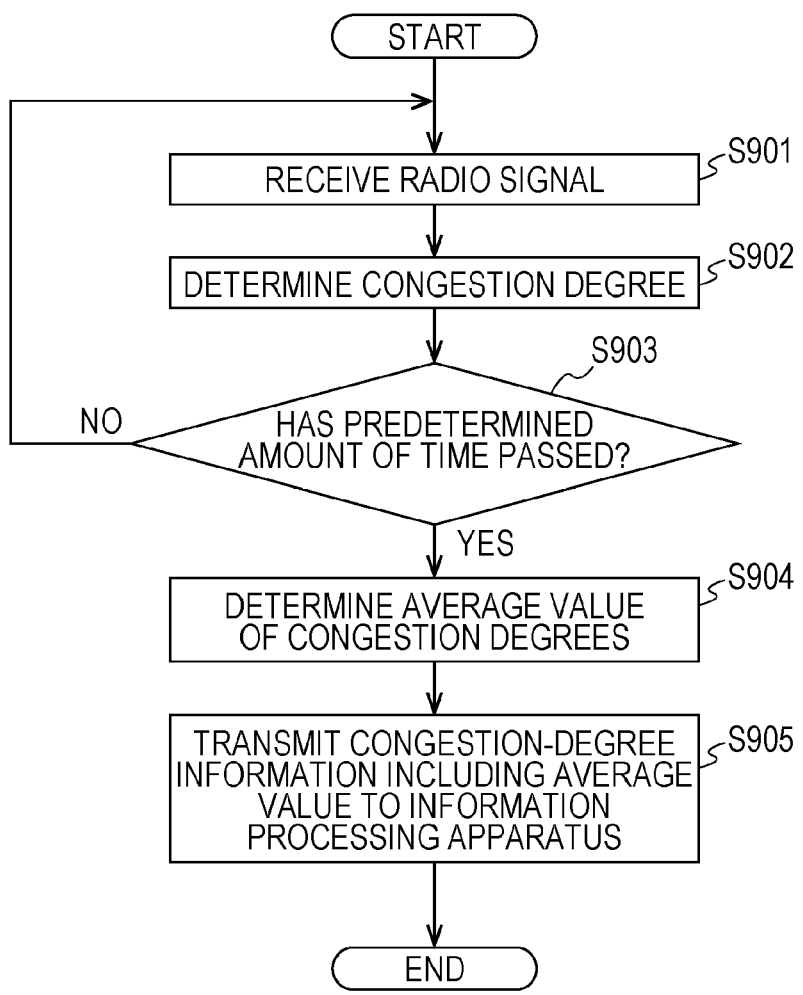
FIG. 4 is a flowchart illustrating one example of a process of congestion-degree-information transmission processing performed by the wireless communication apparatus in the first embodiment of the present technology.

FIG. 4 is a flowchart illustrating one example of a process of congestion-degree-information transmission processing performed by the wireless communication apparatus 200 in the first embodiment of the present technology.

First, in step S901, the wireless communicator 210 receives a radio signal transmitted from the base station. Subsequently, in step S902, the congestion-degree determiner 230 determines a congestion degree (a communication-traffic congestion degree) of the base station. The thus-determined congestion degree is held until an average value is determined.

Subsequently, in step S903, a determination is made as to whether or not a predetermined amount of time has passed. When it is determined that the predetermined amount of time has not passed, the process returns to step S901. The predetermined amount of time is a period in which the average value of congestion degrees is determined, and is, for example, 10 minutes.

When the predetermined amount of time has passed (in step S903), the congestion-degree determiner 230 determines the average value of the determined congestion degrees in step S904. For example, the average value of the congestion degrees determined in 10 minutes is determined.

Subsequently, in step S905, the transmission controller 250 transmits, to the information processing apparatus 300, information (congestion-degree information) regarding the average value (i.e., the congestion-degree average value) determined by the congestion-degree determiner 230. The congestion-degree information includes an equipment ID, a base-station ID, position information (acquired by the position-information acquirer 240), and so on.

[Example of Configuration of Information Processing Apparatus]

Figure 5:
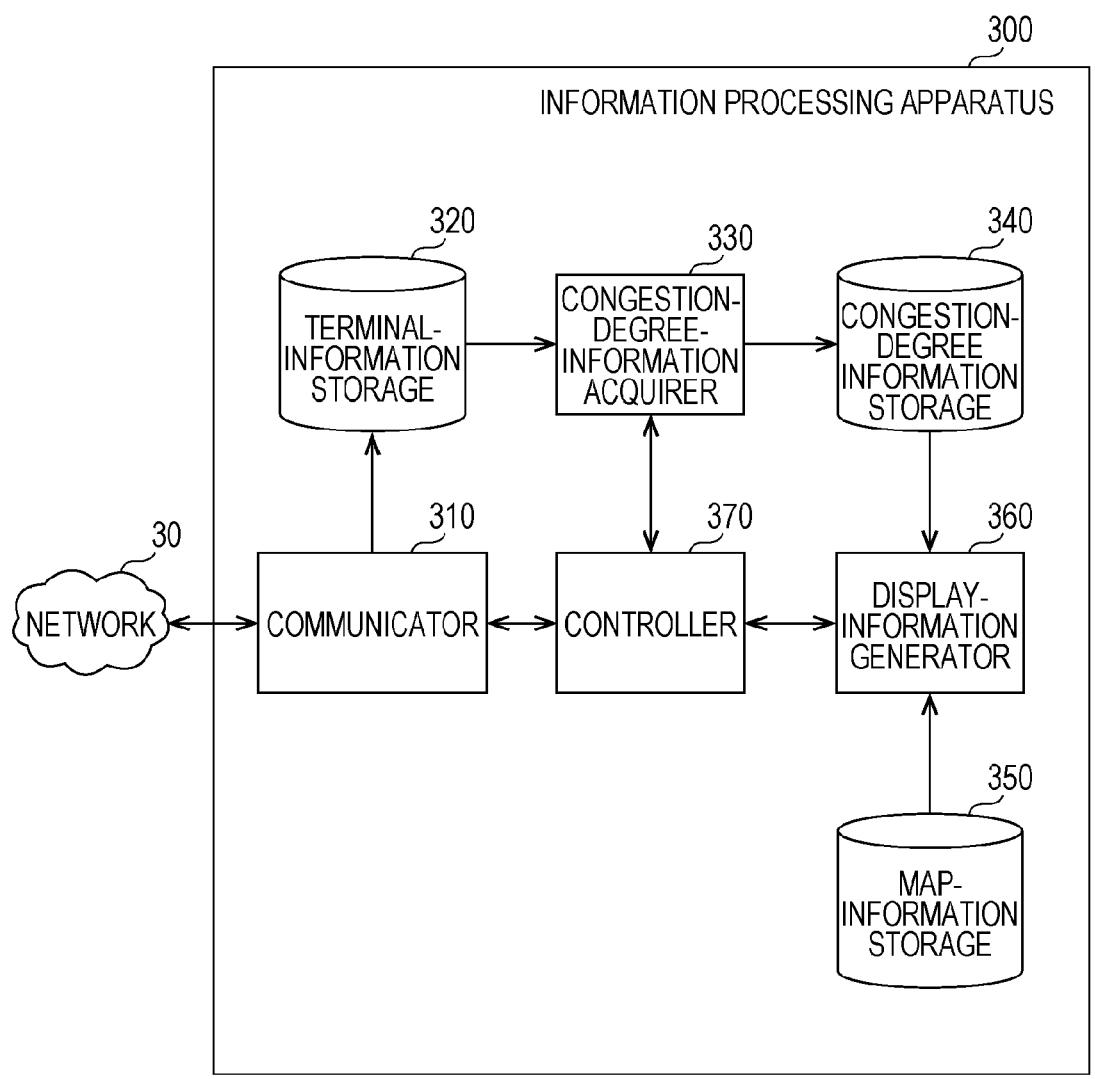
FIG. 5 is a block diagram illustrating an example of the functional configuration of an information processing apparatus in the first embodiment of the present technology.

FIG. 5 is a block diagram illustrating an example of the functional configuration of the information processing apparatus 300 in the first embodiment of the present technology.

The information processing apparatus 300 includes a communicator 310, a terminal-information storage 320, a congestion-degree-information acquirer 330, the congestion-degree information storage 340, a map-information storage 350, a display-information generator 360, and a controller 370.

Under the control of the controller 370, the communicator 310 performs various communications between the wireless communication apparatuses 200 to 202. For example, the communicator 310 receives pieces of information from the wireless communication apparatuses 200 to 202 (e.g., information (such as log information) periodically or irregularly transmitted from the wireless communication apparatuses 200 to 202) and outputs the received pieces of information to the terminal-information storage 320 and the controller 370. Also, upon obtaining a congestion-degree-information acquire request from any of the wireless communication apparatuses 200 to 202, the communicator 310 outputs the congestion-degree-information acquire request to the controller 370. That is, the communicator 310 receives a congestion-degree-information acquire request (designation information) corresponding to a user operation for designating an area for which an index indicating a human congestion degree is to be displayed. The communicator 310 is one example of a receiver recited in the appended claims.

The terminal-information storage 320 stores therein the pieces of information transmitted from the wireless communication apparatuses 200 to 202 and supplies the stored pieces of information to the congestion-degree-information acquirer 330. Contents stored in the terminal-information storage 320 are described later in detail with reference to FIG. 6.

The congestion-degree-information acquirer 330 acquires information regarding the congestion degrees (i.e., the congestion-degree information) from the information stored in the terminal-information storage 320, classifies the acquired congestion-degree information according to the communication service providers, and causes the congestion-degree information storage 340 to store therein the classified congestion-degree information.

The congestion-degree information storage 340 is adapted to store therein the congestion-degree information acquired by the congestion-degree-information acquirer 330 and to supply the stored congestion-degree information to the display-information generator 360.

The map-information storage 350 is adapted to store therein information (map information) regarding a map and places (e.g., tourist sites) on the map and to supply the stored map information to the display-information generator 360. For example, similarly to map-providing services on the Internet, places may be compiled into a database with latitudes and longitudes so that the places can be used as the map information.

Under the control of the controller 370, the display-information generator 360 generates display information to be displayed on the wireless communication apparatuses 200 to 202, and outputs the generated display information to the controller 370. For example, the display-information generator 360 performs various computational operations on the congestion-degree information stored in the congestion-degree information storage 340 and outputs display information including a result of the computational operations to the controller 370. For example, the display-information generator 360 outputs, to the controller 370, display information including the map information stored in the map-information storage 350 and a result of the computational operations.

For example, the display-information generator 360 extracts one or more base stations located in an area indicated by the congestion-degree-information acquire request (designation information) and determines the degree of communication-traffic congestion in the area on the basis of the communication-traffic congestion degree(s) regarding the extracted base station(s). In this case, the display-information generator 360 uses the communication-traffic congestion degree(s) acquired by one or more wireless communication apparatuses present in the area as the communication-traffic congestion degree(s) regarding the extracted base station(s).

For example, the display-information generator 360 averages the communication-traffic congestion degree(s) acquired by the wireless communication apparatus(es) present in the area, to thereby determine the degree of communication-traffic congestion in the area. For example, the display-information generator 360 aggregates, at predetermined intervals (e.g., the current day, previous day, or previous week), the communication-traffic congestion degree(s) acquired by the wireless communication apparatus(es) present in the area. The display-information generator 360 then determines at least one of the degree of current communication-traffic congestion in the area and the degree of communication-traffic congestion in the past in the area. The display-information generator 360 also determines the ratio of the degree of current communication-traffic congestion in the area to the degree of communication-traffic congestion in the past in the area (e.g., the ratio of today's congestion degree to the previous day's congestion degree or the ratio of this week's congestion degree to the previous week's congestion degree) as an index (indicating a human congestion degree) for the area. The display-information generator 360 also determines, as an index (indicating a human congestion degree) for the area, the ratio of the degree of communication-traffic congestion at one time point in the past in the area to the degree of communication-traffic congestion at another time point in the past (e.g., the ratio of a congestion degree in August of last year to a congestion degree in August the year before last). The display-information generator 360 is one example of a determiner recited in the appended claims.

The controller 370 performs various types of control on the basis of a control program stored in a memory (not illustrated). The controller 370 is implemented by, for example, a microprocessor. For example, the controller 370 is connected to the communicator 310 to transmit/receive various data to/from the wireless communication apparatuses 200 to 202.

For example, upon receiving a congestion-degree-information acquire request (designation information) corresponding to a user operation for designating an area for which an index representing a human congestion degree is to be displayed, the controller 370 performs control for providing the degree of communication-traffic congestion in the area as the index. That is, the controller 370 causes the display-information generator 360 to generate display information including the degree of communication-traffic congestion in the area, transmits the generated display information to the wireless communication apparatus that transmitted the congestion-degree-information acquire request, and causes the generated display information to be displayed.

For example, the controller 370 performs control so that the degree of communication-traffic congestion in the area in a period (e.g., the current day or previous day) specified by date-and-time information included in the congestion-degree-information acquire request (designation information) is provided as an index for the congestion degree.

In the example illustrated in FIG. 5, the individual elements are included in one information processing apparatus (e.g., the information processing apparatus 300). The individual elements, however, may be separated into multiple information processing apparatuses (e.g., a communication apparatus and a storage device).

[Example of Contents of Terminal-Information Storage]

FIG. 6 is a table schematically illustrating an example of contents stored in the terminal-information storage 320 in the first embodiment of the present technology.

A timestamp 321, an equipment ID 322, a base-station ID 323, position information 324, and a congestion degree 325 are associated with each other and are stored in the terminal-information storage 320.

The timestamp 321 is information regarding the date and time when information to be recorded is received from the wireless communication apparatus.

The equipment ID 322 is identification information for identifying the wireless communication apparatus that transmits the information to be recorded. In FIG. 6, for ease of description, the equipment ID given to each wireless communication apparatus is illustrated in a simplified representation.

The base-station ID 323 is identification information for identifying a base station (cell) operated by a communication service provider. For example, the base-station ID of a base station with which the wireless communication apparatus that transmits the information to be recorded is wirelessly connected is stored as the base-station ID 323.

The position information 324 is information regarding the position where the wireless communication apparatus that transmits the information to be recorded is present. For example, a latitude and a longitude corresponding to the position where the wireless communication apparatus that transmits the information to be recorded is present are stored as the position information 324.

The congestion degree 325 is information regarding a congestion degree (a communication-traffic congestion degree) of a base station operated by a communication service provider. Averaged congestion degrees (e.g., the congestion degrees illustrated in FIG. 3B) are stored as the congestion degrees 325.

Although other information periodically or irregularly transmitted from the wireless communication apparatuses is also recorded in the terminal-information storage 320, illustration and description thereof are omitted herein.

[Example of Contents of Congestion-Degree Information Storage]

FIG. 7 is a table schematically illustrating one example of contents stored in the congestion-degree information storage 340 in the first embodiment of the present technology.

Date and time 341, a base-station ID 342, position information 343, and the congestion degree 344 are associated with each for each communication service provider and are stored in the congestion-degree information storage 340. For ease of description, FIG. 7 illustrates only a first communication service provider and a second communication service provider. The date and time 341, the base-station ID 342, the position information 343, and the congestion degree 344 correspond to the timestamp 321, the base-station ID 323, the position information 324, and the congestion degree 325, respectively, illustrated in FIG. 6. Thus, descriptions of those pieces of information are omitted in this case.

Although the congestion-degree information storage 340 can also record other information regarding the congestion-degree information transmitted from the wireless communication apparatuses, illustration and description of such information are omitted herein.

[Example of Output of Congestion Degrees]

FIGS. 8A, 8B, 9A, and 9B are graphs illustrating examples of congestion degrees managed by the information processing apparatus 300 in the first embodiment of the present technology. In FIGS. 8A, 8B, 9A, and 9B, transition of congestion degrees of one communication service provider in the vicinity of Shinagawa station is illustrated in a time sequence. The relationship of the horizontal axis and the vertical axis is the same as the relationship in FIG. 3B.

Figure 8A:
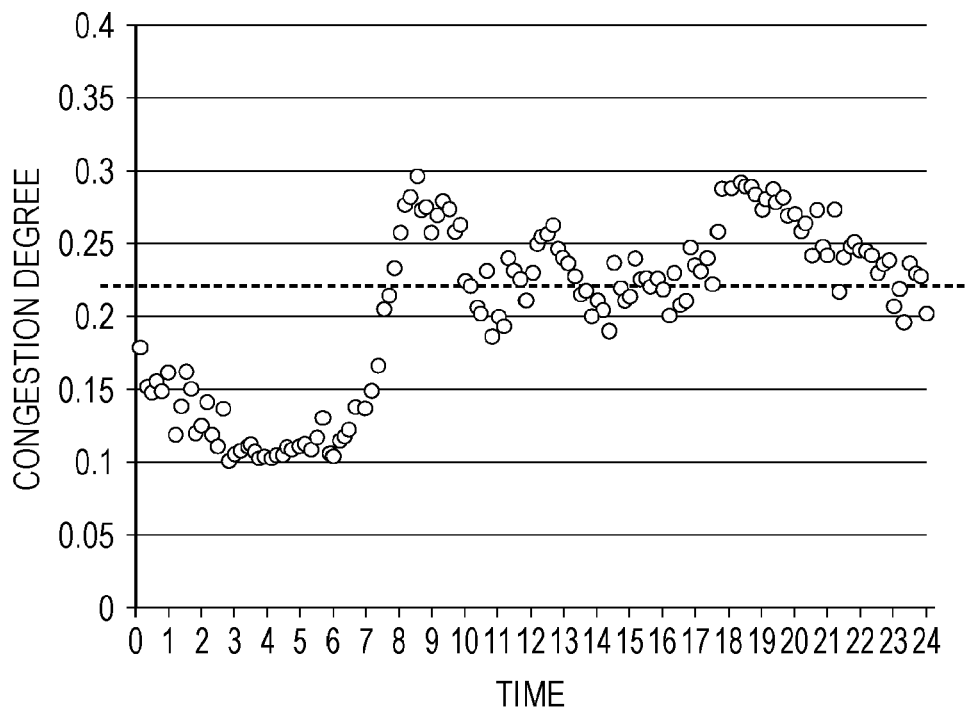
FIGS. 8A and 8B are graphs illustrating examples of congestion degrees managed by the information processing apparatus in the first embodiment of the present technology.
Figure 8B:
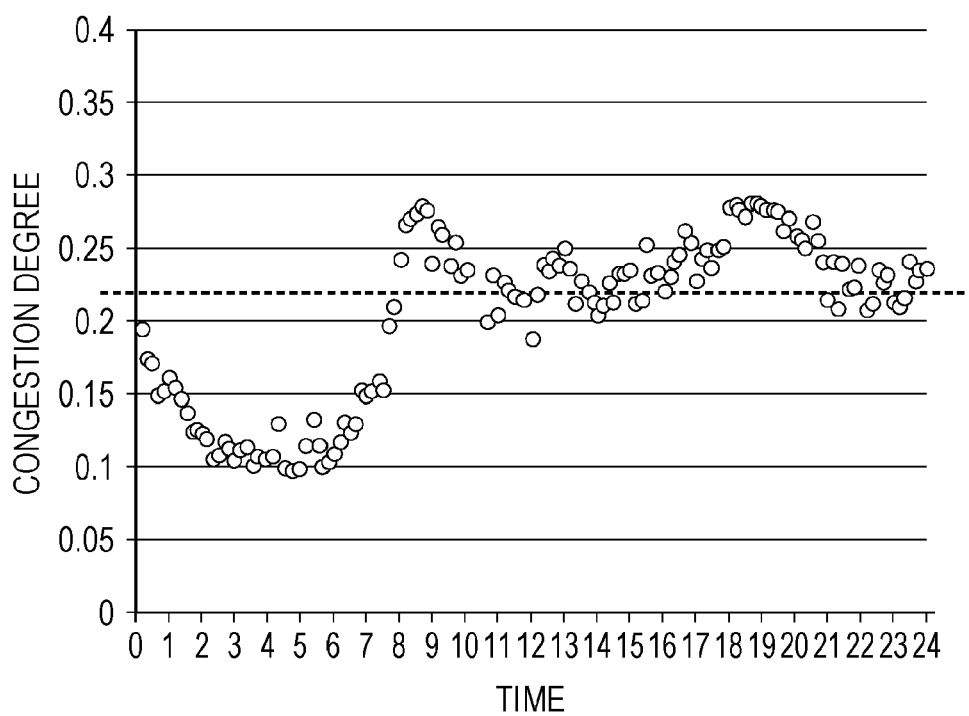

FIGS. 8A and 8B each illustrate transition of congestion degrees on a weekday. More specifically, FIG. 8A illustrates transition of congestion degrees on Nov. 1 (Tuesday), 2011. FIG. 8B illustrates transition of congestion degrees on Nov. 2 (Wednesday), 2011.

Figure 9A:
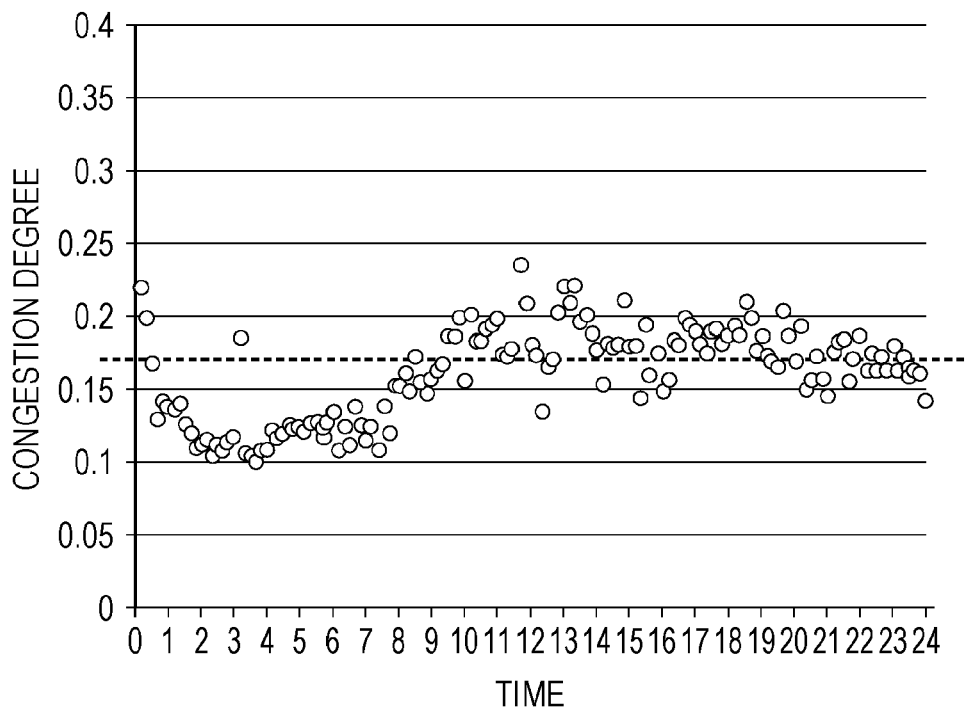
FIGS. 9A and 9B are graphs illustrating examples of congestion degrees managed by the information processing apparatus in the first embodiment of the present technology.
Figure 9B:
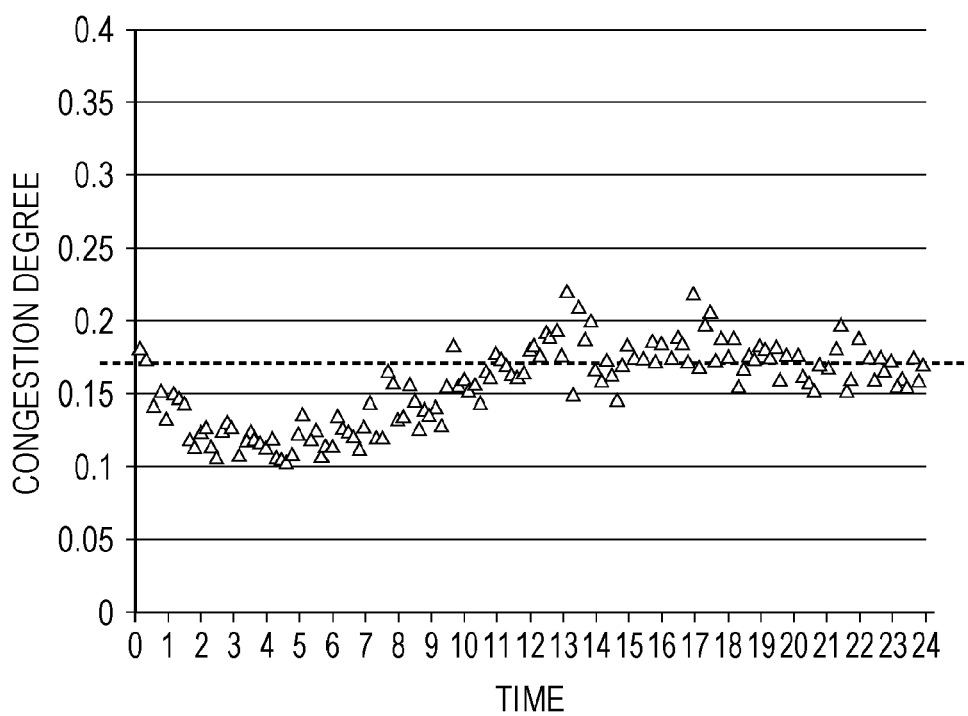

FIGS. 9A and 9B illustrate transitions of congestion degrees on a holiday (weekday) and Sunday, respectively. More specifically, FIG. 9A illustrates transition of congestion degrees on Nov. 3 (Thursday, holiday), 2011. FIG. 9B illustrates transition of congestion degrees on Nov. 6 (Sunday), 2011.

As illustrated in FIGS. 8A and 8B, the congestion degrees increase during the morning and evening rush hours on weekdays and in the hour from about 12:00 to about 13:00 and the congestion degrees are nearly zero during late night hours (2:00 to 6:00) when no trains are running. In contrast, as illustrated in FIGS. 9A and 9B, the congestion degrees on Sunday or a holiday (weekday) are not as high as the congestion degrees during the rush hours on the weekdays and differences between the congestion degrees in the daytime and the congestion degrees in the night are also smaller than the differences on the weekdays.

FIGS. 8A, 8B, 9A, and 9B show that, with respect to differences on a weekday, Sunday, a holiday (including the daytime), the correlation between the congestion degrees of the base station and the actual crowd congestion degrees is high. The correlation has also been verified with individual pieces of data. Thus, congestion degrees (communication-traffic congestion degrees) as illustrated in FIGS. 8A, 8B, 9A, and 9B can be used as actual crowd congestion degrees for a position corresponding to the congestion degrees.

While FIGS. 8A, 8B, 9A, and 9B illustrate transitions of congestion degrees regarding one communication service provider in the same area, congestion degrees regarding multiple communication service providers in the same area may be used. In such a case, the reliability can further be increased. However, when congestion degrees regarding multiple communication service providers in the same area are used, the congestion degrees are averaged. A method for the averaging is described later in more detail with reference to FIGS. 15A to 15C.

[Example of Display of Congestion Degrees]

Figure 10A:
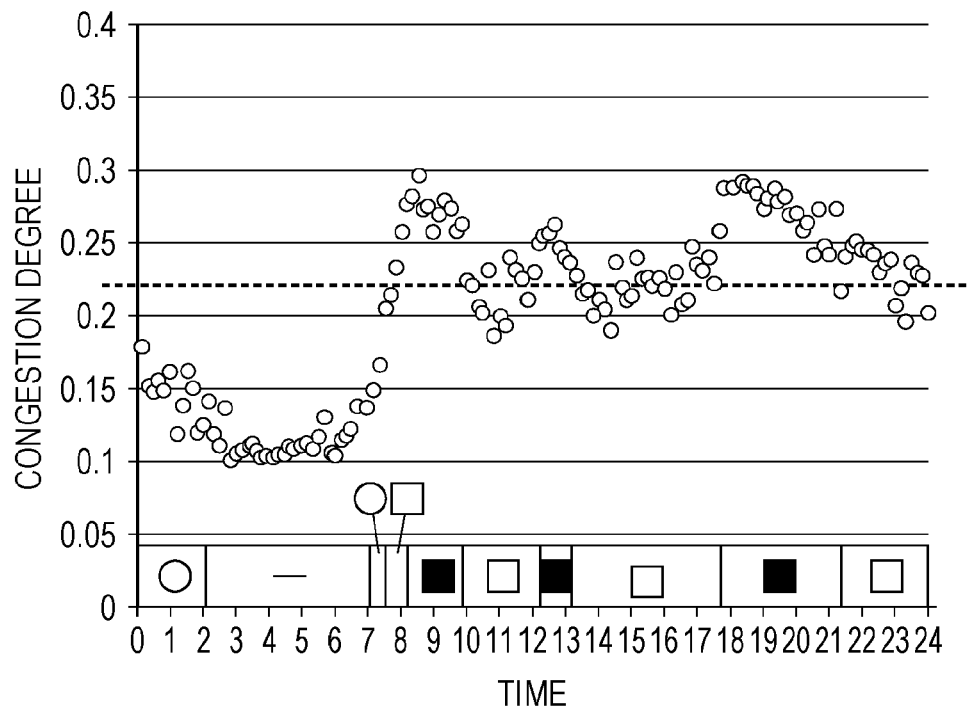
FIGS. 10A and 10B are graphs illustrating examples of congestion-degree information displayed under the control of the information processing apparatus in the first embodiment of the present technology.
Figure 10B:
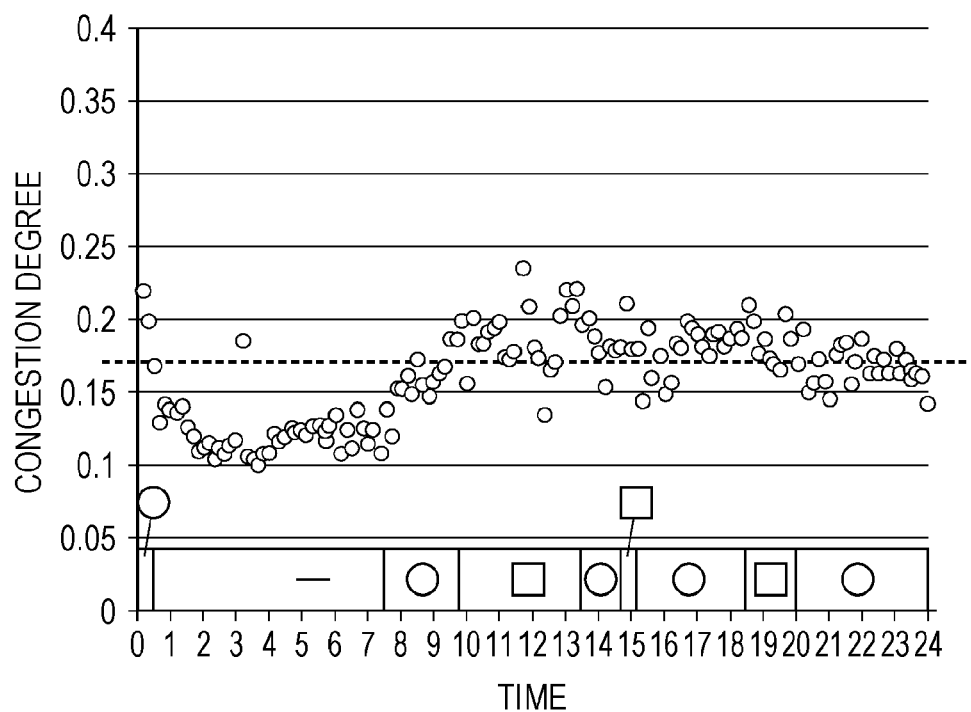

FIGS. 10A and 10B are graphs illustrating examples of the congestion-degree information displayed under the control of the information processing apparatus 300 in the first embodiment of the present technology. The example illustrated in FIG. 10A corresponds to FIG. 8A and the example illustrated in FIG. 10B corresponds to FIG. 9A. Thus, with reference to FIGS. 10A and 10B, points that are different from those in FIGS. 8A, 8B, 9A; and 9B are mainly described.

FIGS. 10A and 10B illustrate examples in which the congestion degrees are classified and displayed in four levels. For example, when the congestion degree ($k_{cong}$) is lower than 0.15, almost no people are thought to be present. For example, when the congestion degree is 0.15 or higher and is lower than 0.2, the place in question is thought to be crowded to a degree comparable to congestion during the daytime on holidays. For example, when the congestion degree is 0.2 or higher and is lower than 0.25, the place in question is thought to be crowded to a degree comparable to congestion during the daytime on weekdays. Also, for example, when the congestion degree is 0.25 or higher, the place in question is thought to be so crowded.

Accordingly, for example, a time slot in which the congestion degree is lower than 0.15 is indicated by "-" and a time slot in which the congestion degree is 0.15 or higher and is lower than 0.2 is indicated by "○". In addition, for example, a time slot in which the congestion degree is 0.2 or higher and is lower than 0.25 is indicated by "□" and a time slot in which the congestion degree is 0.25 or higher is indicated by "■".

Figure 11:
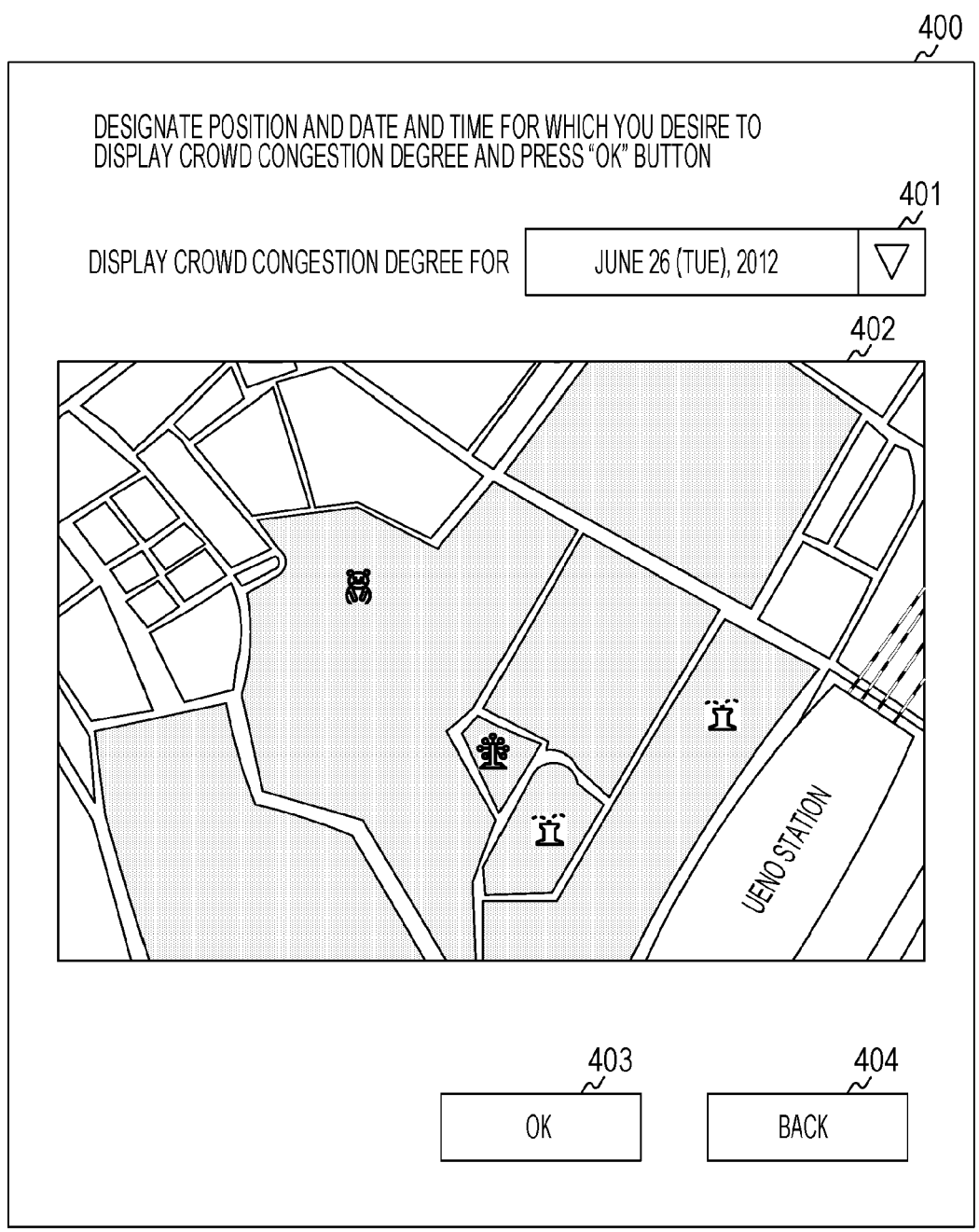
FIG. 11 illustrates a display screen example (a display screen) for designating a position and date and time for which the wireless communication apparatus according to the first embodiment of the present technology displays congestion-degree information.

For example, when the user uses the operation receiver 260 in the wireless communication apparatus 200 to input pieces of information regarding a position and date and time, the transmission controller 250 in the wireless communication apparatus 200 transmits a congestion-degree-information acquire request to the information processing apparatus 300. FIG. 11 illustrates an example of the inputting of the pieces of information. When the congestion-degree-information acquire request is received, the display-information generator 360 in the information processing apparatus 300 acquires, from the congestion-degree information storage 340, a congestion degree regarding the position and the date and time input by the user operation and generates display information by using the acquired congestion-degree information. The controller 370 supplies the generated display information to the wireless communication apparatus 200 via the communicator 310.

Figure 20A:
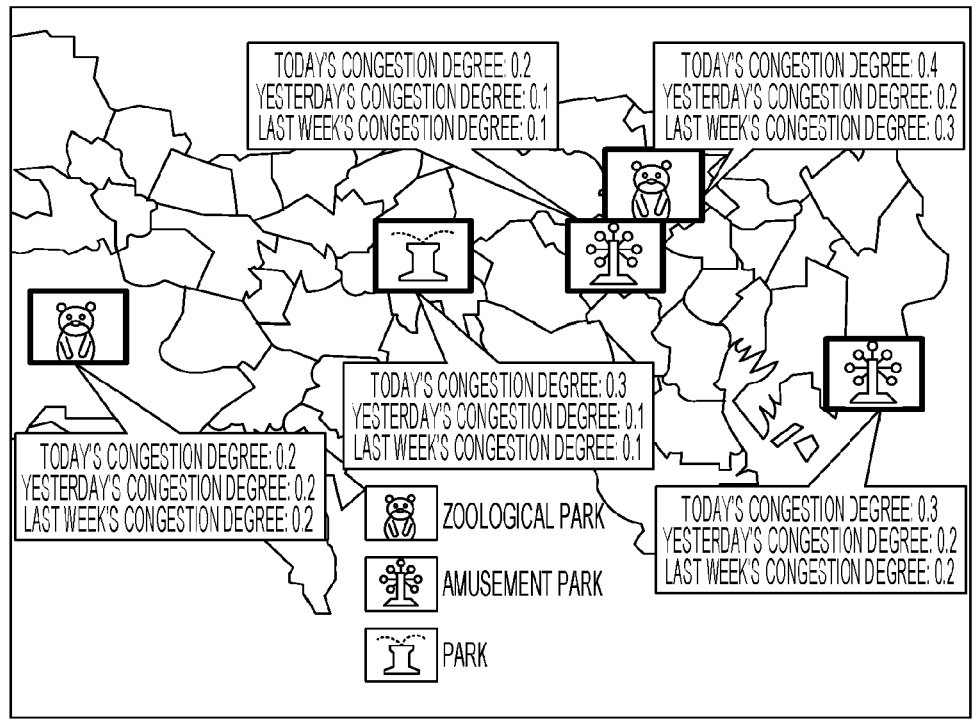
FIGS. 20A and 20B illustrate examples of a display screen displayed on the wireless communication apparatus in the second embodiment of the present technology.
Figure 20B:
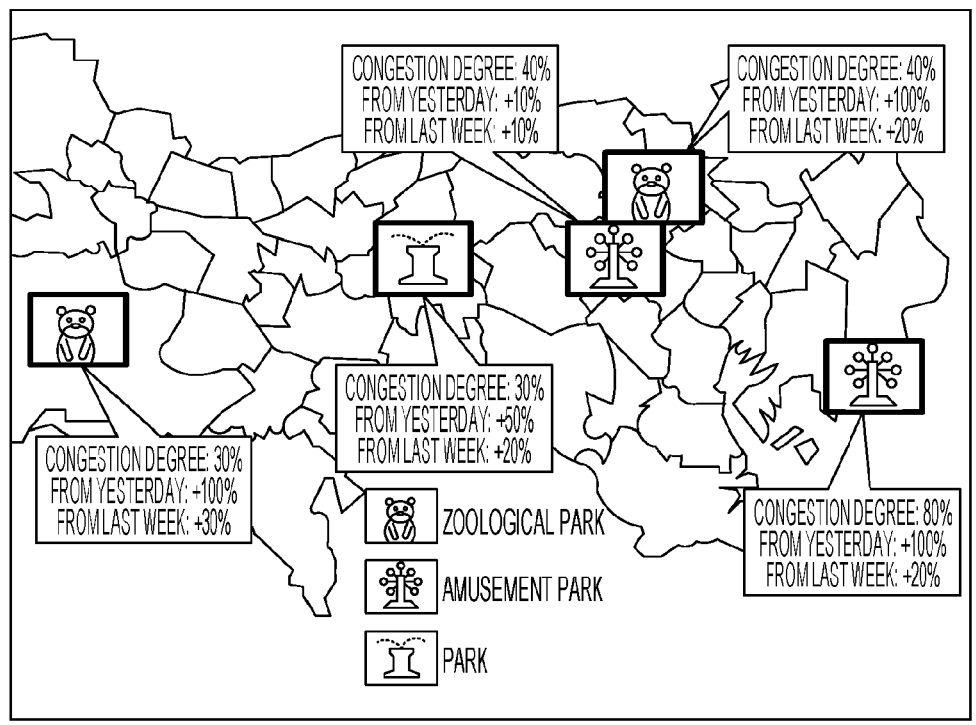
Figure 21:
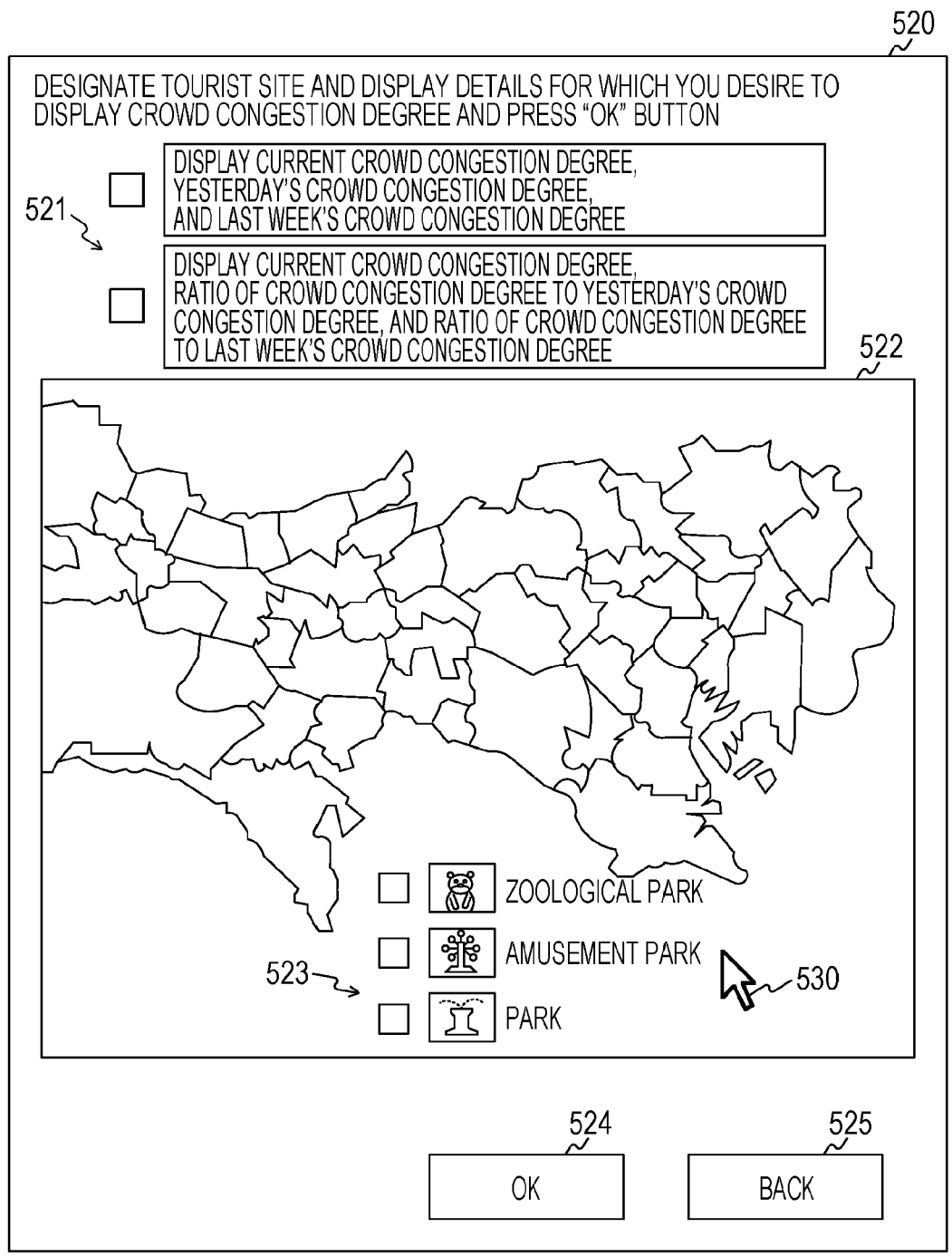
FIG. 21 illustrates an example of transition of a display screen (a display screen) for designating display details of congestion-degree information through use of the wireless communication apparatus in the second embodiment of the present technology.

Although FIGS. 10A and 10B each illustrate an example in which the signs (-, ○, □, ■) indicating the congestion degrees are displayed superimposed on the corresponding graphs illustrated in FIGS. 8A, 8B, 9A, and 9B, only the signs (-, ○, □, ■) indicating the congestion degrees may be displayed in a time sequence. The congestion degrees may be displayed in another display form. Examples of such a display form are illustrated in FIGS. 20A and 20B.

[Example of Designating Position and Date and Time]

FIG. 11 illustrates a display screen example (a display screen 400) for designating a position and date and time for which the wireless communication apparatus 200 according to the first embodiment of the present technology displays congestion-degree information. In FIG. 11, a map is schematically illustrated for ease of description.

The display screen 400 has a date-and-time information designation region 401, a map-information designation region 402, an "OK" button 403, and a "back" button 404.

The date-and-time information designation region 401 is a region for designating the date and time for which the user desires display of the congestion-degree information. For example, the date and time can be designated by a desired-date-and-time designating operation with the direct inputting or pull-down button pressing by the user.

The map-information designation region 402 is a region for designating a position for which the user desires display of the congestion-degree information. For example, the user can display a map of his or her desired region by performing a direct input (e.g., input of an address or zip/postal code) or performing a designation operation on a map (e.g., a map of each country or prefecture) displayed in a reduced size. The user can also designate his or her desired position by performing a designation operation on the map displayed in the map-information designation region 402. The display controller 270 obtains, from a map-information storage (not illustrated), map information for display of the map in the map-information designation region 402, in accordance with the designation operation performed by the user. Also, the map information stored in an apparatus (e.g., the information processing apparatus 300 or a map-information storage device) other than the wireless communication apparatus 200 may be obtained through a network (e.g., the network 30), such as the Internet.

The "OK" button 403 is pressed for confirming the position and the date and time designated by the user.

The "back" button 404 is pressed for returning the display screen displayed on the display 280 to an immediately preceding screen.

[Example of Communication]

Figure 12:
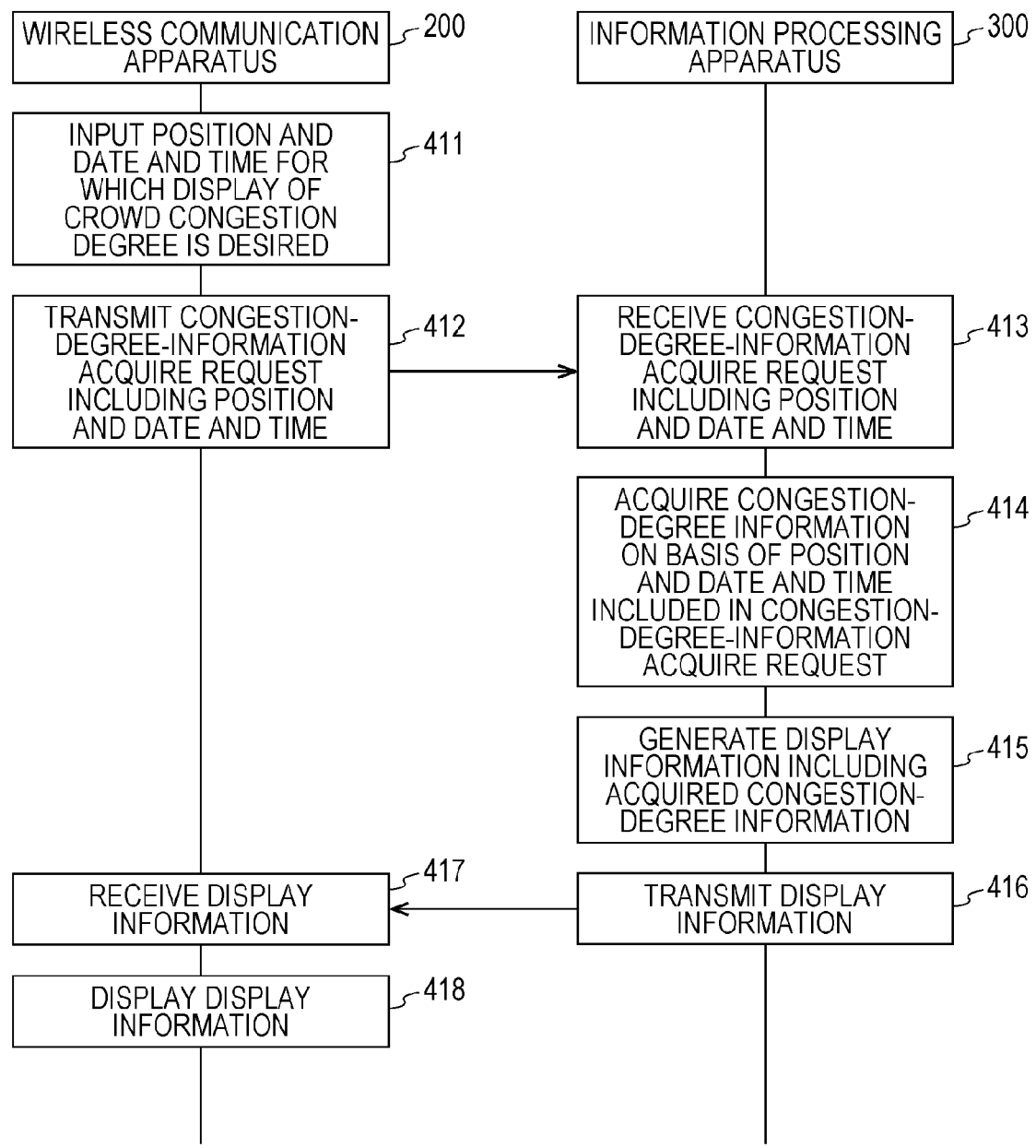
FIG. 12 is a sequence chart illustrating an example of communication processing between the apparatuses included in the communication system in the first embodiment of the present technology.

FIG. 12 is a sequence chart illustrating an example of communication processing between the apparatuses included in the communication system 100 in the first embodiment of the present technology. Although the wireless communication apparatus 200 and the information processing apparatus 300 are connected via the base station and the communication control apparatus, the base station and the communication control apparatus are not illustrated in FIG. 12 for ease of description.

First, at the operation receiver 260 of the wireless communication apparatus 200, the user inputs pieces of information regarding the position and the date and time for which he or she desires to display the crowd congestion degree and performs an operation input for transmitting a congestion-degree-information acquire request (411). The operation input is, for example, a pressing operation of the "OK" button 403 illustrated in FIG. 11. When the pieces of information are input, the transmission controller 250 in the wireless communication apparatus 200 transmits a congestion-degree-information acquire request to the information processing apparatus 300 (412 and 413). The congestion-degree-information acquire request includes the information regarding the position and the date and time, the information being received by the operation receiver 260.

When the congestion-degree-information acquire request is received (413), the display-information generator 360 in the information processing apparatus 300 acquires, from the congestion-degree information storage 340, the congestion-degree information corresponding to the position and the date and time, the congestion-degree information being included in the congestion-degree-information acquire request (414). For example, the display-information generator 360 acquires the congestion degrees regarding each communication service provider that is the closest to the position included in the congestion-degree-information acquire request and acquires only the congestion-degree information corresponding to the date and time included in the congestion-degree-information acquire request. The display-information generator 360 in the information processing apparatus 300 uses the acquired congestion-degree information to generate display information for causing the wireless communication apparatus (e.g., the wireless communication apparatus 200) that transmitted the congestion-degree-information acquire request to display the congestion degree (415).

Subsequently, the controller 370 in the information processing apparatus 300 transmits the generated display information to the wireless communication apparatus 200 via the communicator 310 (416 and 417). On the basis of the received display information, the display controller 270 in the wireless communication apparatus 200 causes a display screen to be displayed on the display 280 (418).

[Example of Operation of Information Processing Apparatus]

Figure 13:
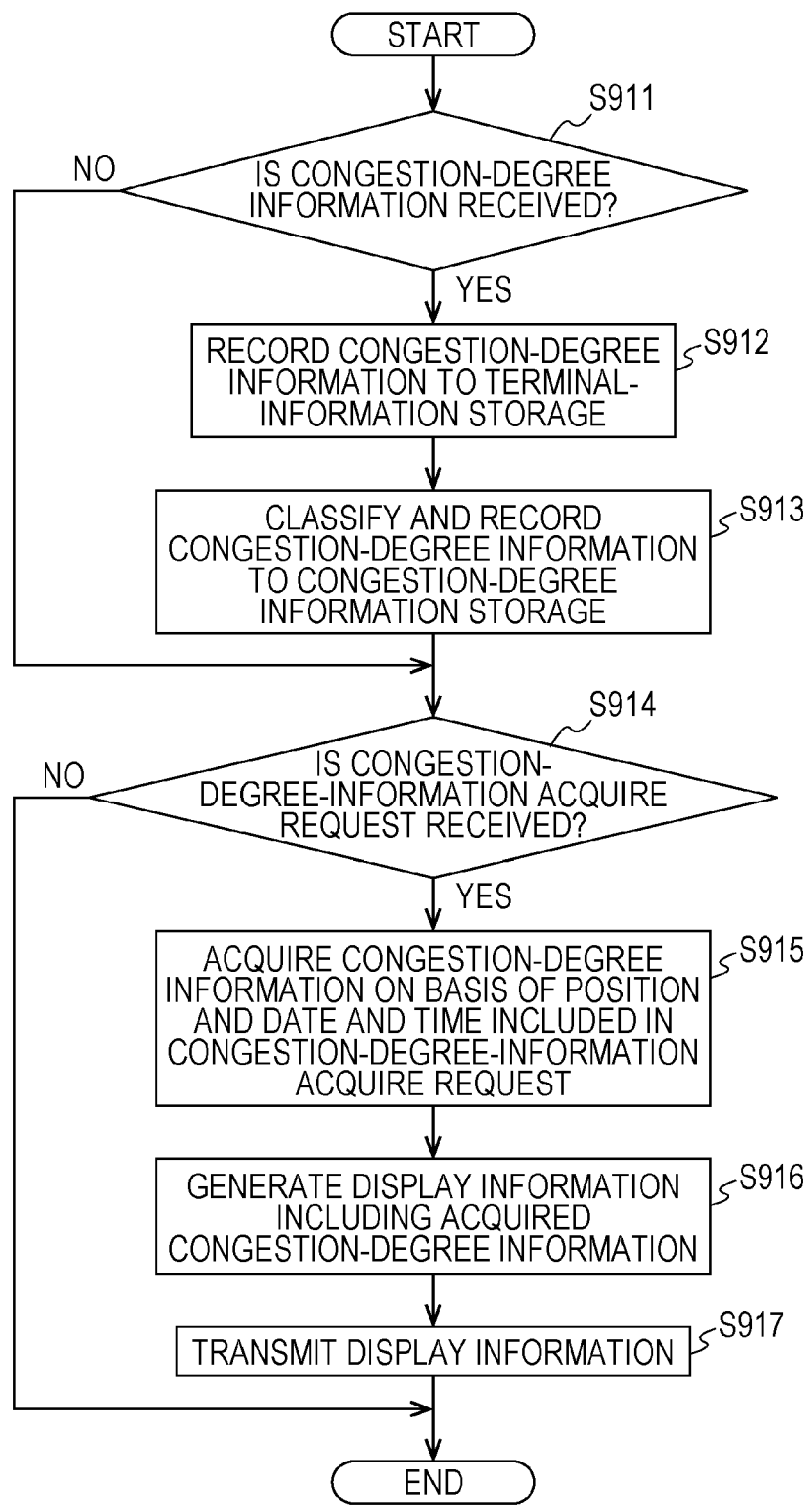
FIG. 13 is a flowchart illustrating one example of a process for congestion-degree-information providing processing performed by the information processing apparatus in the first embodiment of the present technology.

FIG. 13 is a flowchart illustrating one example of a process for congestion-degree-information providing processing performed by the information processing apparatus 300 in the first embodiment of the present technology.

First, in step S911, a determination is made as to whether or not congestion-degree information is received from the wireless communication apparatus. When it is determined that no congestion-degree information is received from the wireless communication apparatus, the process proceeds to step S914. On the other hand, when congestion-degree information is received from the wireless communication apparatus (in step S911), the communicator 310 records the received congestion-degree information to the terminal-information storage 320 in step S912. Subsequently, in step S913, the congestion-degree-information acquirer 330 acquires the congestion-degree information from the terminal-information storage 320, classifies the congestion-degree information according to the communication service providers, and records the classified congestion-degree information to the congestion-degree information storage 340.

Subsequently, in step S914, a determination is made as to whether or not a congestion-degree-information acquire request is received. When it is determined that a congestion-degree-information acquire request is not received, the operation for the congestion-degree-information providing processing ends. On the other hand, when a congestion-degree-information acquire request is received (in step S914), the process proceeds to step S915 in which the display-information generator 360 acquires, from the congestion-degree information storage 340, the congestion-degree information corresponding to the position and the date and time included in the congestion-degree-information acquire request.

Subsequently, in step S916, the display-information generator 360 uses the acquired congestion-degree information to generate display information for causing the congestion degree to be displayed on the wireless communication apparatus that transmitted the congestion-degree-information acquire request. Subsequently, in step S917, the controller 370 transmits the generated display information to the wireless communication apparatus 200 via the communicator 310. Step S914 is one example of a receiving process recited in the appended claims. Steps S915 to S917 are examples of a control process recited in the claims.

[Example of Determining Congestion Degree at Place where Base Stations are Densely Placed]

The above description has been given of an example in which the congestion degrees regarding each communication service provider that is the closest to the position designated by the user are used to determine a crowd congestion degree. In order to ensure the communication capacity of mobile-phone and data communications, base stations for the mobile-phone and data communications are in many cases installed additionally in regions where congestion is likely. Accordingly, a description below will be given of an example in which congestion degrees regarding multiple base stations are used with respect to a place where base stations are densely placed.

[Example of Placement of Base Stations]

Figure 14A:
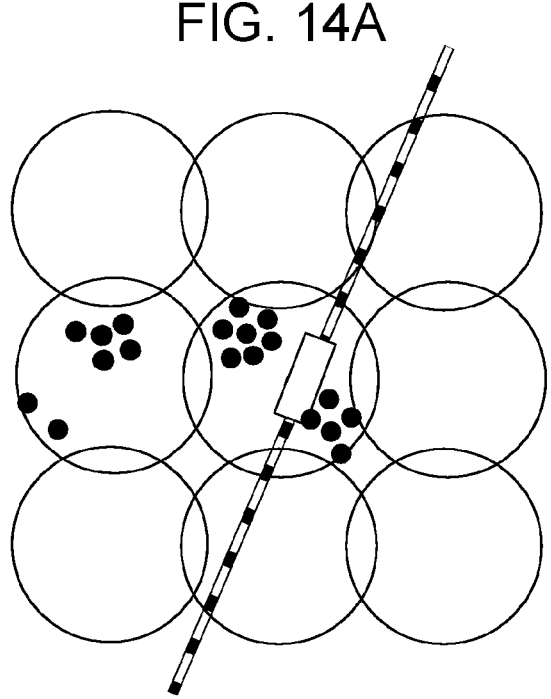
FIGS. 14A and 14B illustrate an example of transition of placement of base stations.
Figure 14B:
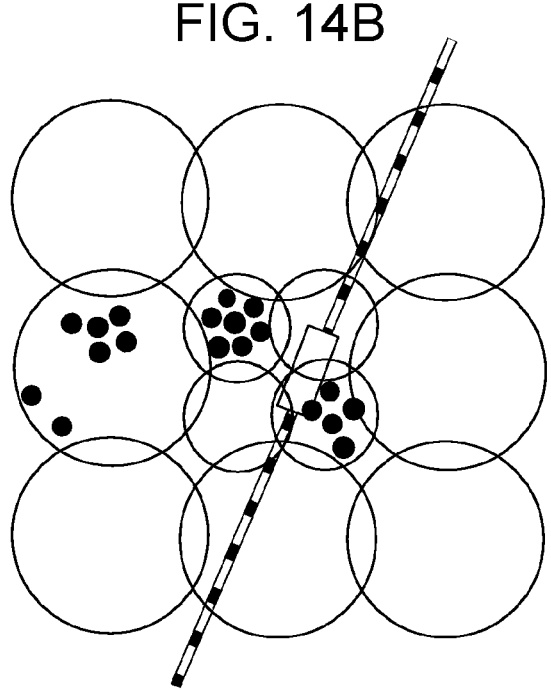

FIGS. 14A and 14B illustrate an example of transition of placement of base stations.

FIG. 14A illustrates an initial state in which the base stations are placed. FIG. 14B illustrates a state in which additional base stations are placed. In FIGS. 14A and 14B, white circles represent cells and black circles represent wireless communication apparatuses. A white rectangle on a railroad represents a station. Although actual cells have shapes (e.g., a hexagon) other than a circle, the cells in FIGS. 14A and 14B are represented by circles for ease of description. The same also applies to the shapes of the cells in the subsequent figures.

As described above, in order to ensure the communication capacity of mobile-phone and data communications, base stations for the mobile-phone and data communications are additionally installed in areas where congestion is likely (e.g., in the vicinity of a station). For example, as illustrated in FIG. 14B, multiple base stations (cells) may be installed in the vicinity of a station where people are likely to gather.

When base stations are densely placed as illustrated in FIG. 14B, the base stations can be utilized to detect the congestion degree. With this arrangement, the congestion degree can be more finely detected in an area where congestion is likely. For example, detailed congestion degrees of the east and west sides of the station illustrated in FIG. 14B can be detected.

[Example of Determining Congestion Degree]

Figure 15A:
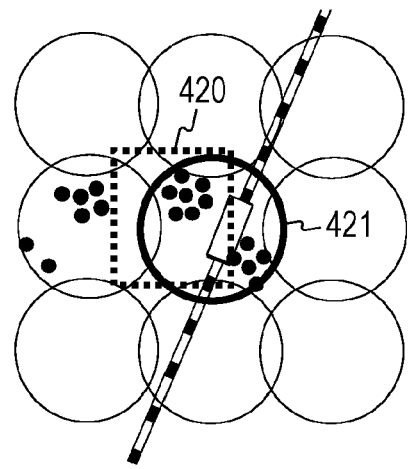
FIGS. 15A to 15C schematically illustrate an example of congestion-degree determination made by a display-information generator according to the first embodiment of the present technology.
Figure 15B:
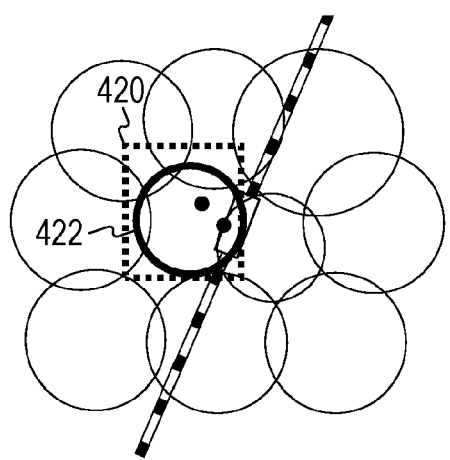
Figure 15C:
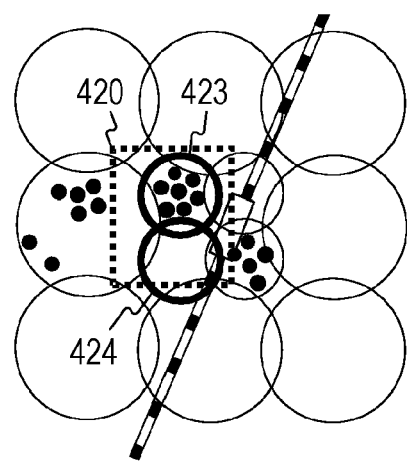

FIGS. 15A to 15C schematically illustrate an example of congestion-degree determination made by the display-information generator 360 according to the first embodiment of the present technology.

FIG. 15A illustrates a cell range of a first communication service provider, FIG. 15B illustrates a cell range of a second communication service provider, and FIG. 15C illustrates a cell range of a third communication service provider. The cell ranges illustrated in FIGS. 15A to 15C exist in the same area (in the vicinity of a station).

In general, multiple communication service providers exist in each area. For example, FIGS. 15A to 15C illustrate an example in which three communication service providers exist in the same area. When multiple communication service providers exist in the same area in a manner illustrated in FIGS. 15A to 15C, the congestion degrees for the communication service providers' cell range at least partly included in an area designated by the user can be used to determine a congestion degree for the area.

For example, when the area designated by the user is an area 420 (indicated by a dotted-line rectangle), the communication service providers' cells 421 to 424 that are at least partly included in the area 420 are extracted. That is, the communication service providers' cells 421 to 424 that are the closest to the area 420 are extracted. All of the congestion degrees for the extracted cells 421 to 424 are averaged to determine a congestion degree for the area 420. In such a manner, the use of the congestion degrees for the communication service providers' cells that are the closest to the area 420 makes it possible to generate a congestion degree that is highly reliable as data.

In this case, for example, a crowd congestion degree CD can be determined by:

$$CD = (\text{"Congestion Degree of First Communication Service Provider"} + \text{"Congestion Degree of Second Communication Service Provider"} + \text{"Congestion Degree of Third Communication Service Provider"} + \ldots + \text{"Congestion Degree of } n\text{th Communication Service provider"})/n \quad (2)$$

In this case, n is a value representing the number of communication service providers. As illustrated in FIG. 15C, when a congestion degree for one area is to be determined based on congestion degrees regarding multiple cells, an average value of the congestion degrees is used.

For example, the congestion degree for the cell 421 is represented by CD10, the congestion degree for the cell 422 is represented by CD20, the congestion degree for the cell 423 is represented by CD31, and the congestion degree for the cell 424 is represented by CD32. In this case, in accordance with expression (2) noted above, a congestion degree (crowd congestion degree) CD1 for the area 420 is determined as:

$$CD1 = [CD10 + CD20 + \{(CD31 + CD32)/2\}]/3.$$

[Example of Determining Congestion Degree at Tourist Site]

Figure 16A:
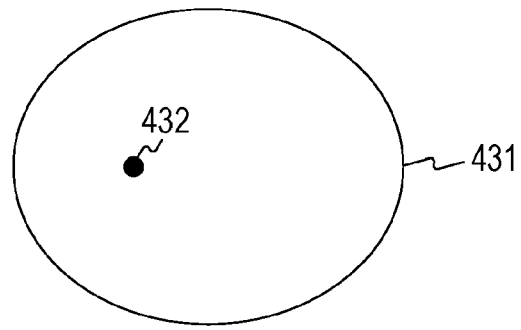
FIGS. 16A to 16C schematically illustrate an example of congestion-degree determination made by the display-information generator in the first embodiment of the present technology.
Figure 16B:
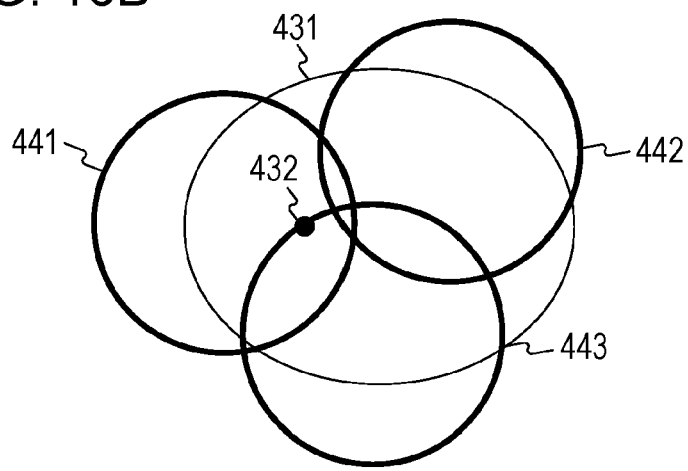
Figure 16C:
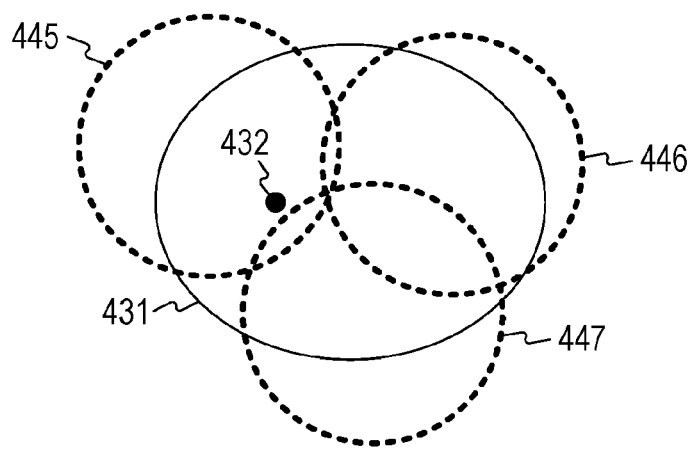

FIGS. 16A to 16C schematically illustrate an example of congestion-degree determination made by the display-information generator 360 in the first embodiment of the present technology. FIGS. 16A to 16C illustrate examples for determining a congestion degree at a place, such as a tourist site.

FIG. 16A illustrates a relationship between a tourist site 431 and a registered place 432 therein.

For example, since many tourist sites are generally vast places, each tourist site is in many cases recognized for each area, rather than being recognized as a place specified by a latitude and a longitude. Accordingly, in general, crowd congestion degrees for places, such as the tourist site 431, may be checked for each area.

However, in general, the locations of tourist sites are in many cases registered (e.g., into a map database) using their addresses. For example, in many cases, specific points are registered as in the case of the registration place 432. The registration place 432 represents a registered location in the tourist site 431 and is generally the location of a main building in the tourist site 431. Since people are generally likely to gather at the registration place 432, transition of congestion degrees regarding the base station that is the closest to the registration place 432 is deemed to be similar to the transition of crowd congestion degrees in the area of the tourist site 431.

In such a case, a tourist site where many people gather (e.g., a vast tourist site) is in many cases covered by multiple base stations. FIGS. 16B and 16C illustrate examples of placement of base stations in the tourist site 431. More specifically, FIG. 16B illustrates an example of placement of, in the tourist site 431, base stations (cells 441 to 443) of a first communication service provider and FIG. 16C illustrates an example of placement of, in the tourist site 431, base stations (cells 445 to 447) of a second communication service provider.

Thus, a crowd congestion degree at the tourist site 431 may be determined by determining an average value of the congestion degrees of a predetermined number of base stations (e.g., three base stations of each communication service provider) in ascending order of distance from the registration place 432. This can improve the accuracy of the congestion degree.

[Example of Designating Range for which Congestion Degree is to be Determined]

The above description has been given of examples in which congestion degrees (crowd congestion degrees) for a position designated by a user are displayed with a graph or signs. However, the user may also desire to view a congestion degree for a relatively large range, rather than a congestion degree for a small range (e.g., for one point or a registered area on a map). In such cases, it is preferable to present the user with a congestion degree for the large range. Now, a description will be given of an example of a congestion degree (a crowd congestion degree) for a position or a range designated by the user is presented to the user.

[Example of Designating Range and Date and Time]

Figure 17A:
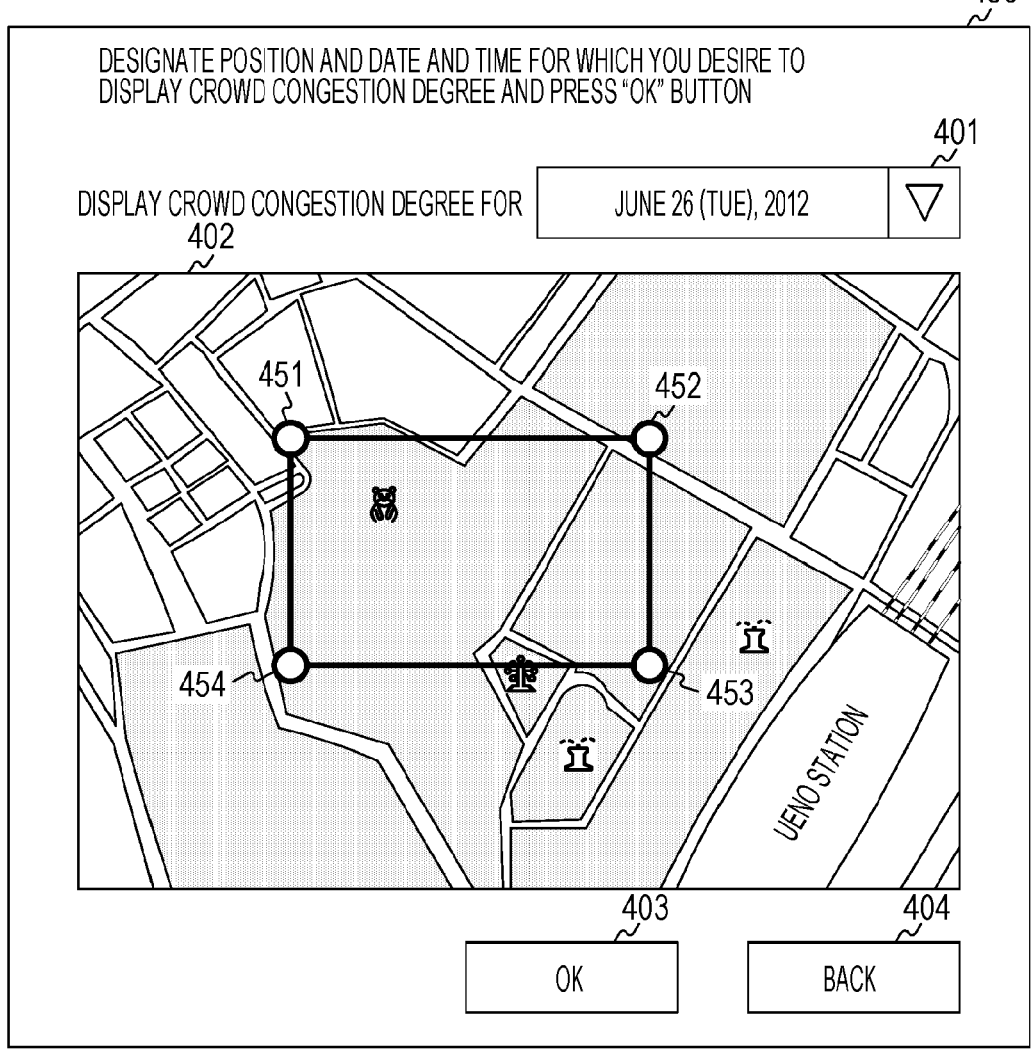
FIGS. 17A and 17B illustrate a display screen example (a display screen) for designating a range and date and time for which the wireless communication apparatus in the first embodiment of the present technology displays congestion-degree information.
Figure 17B:
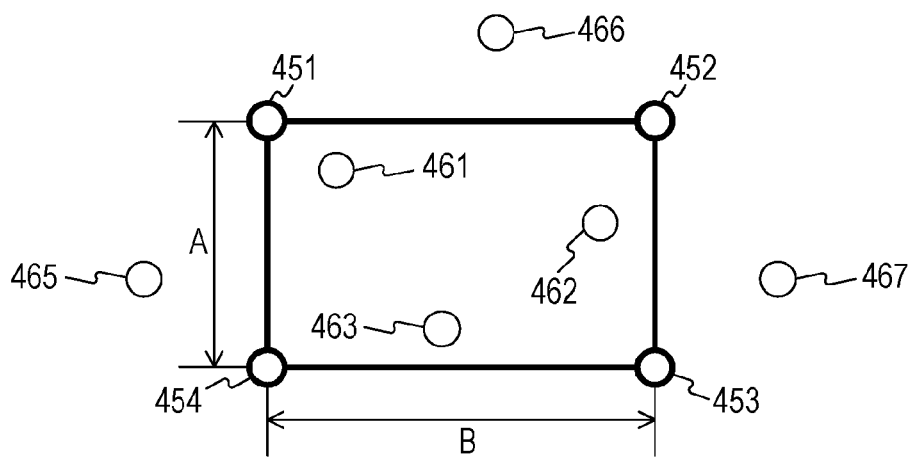
Figure 18:
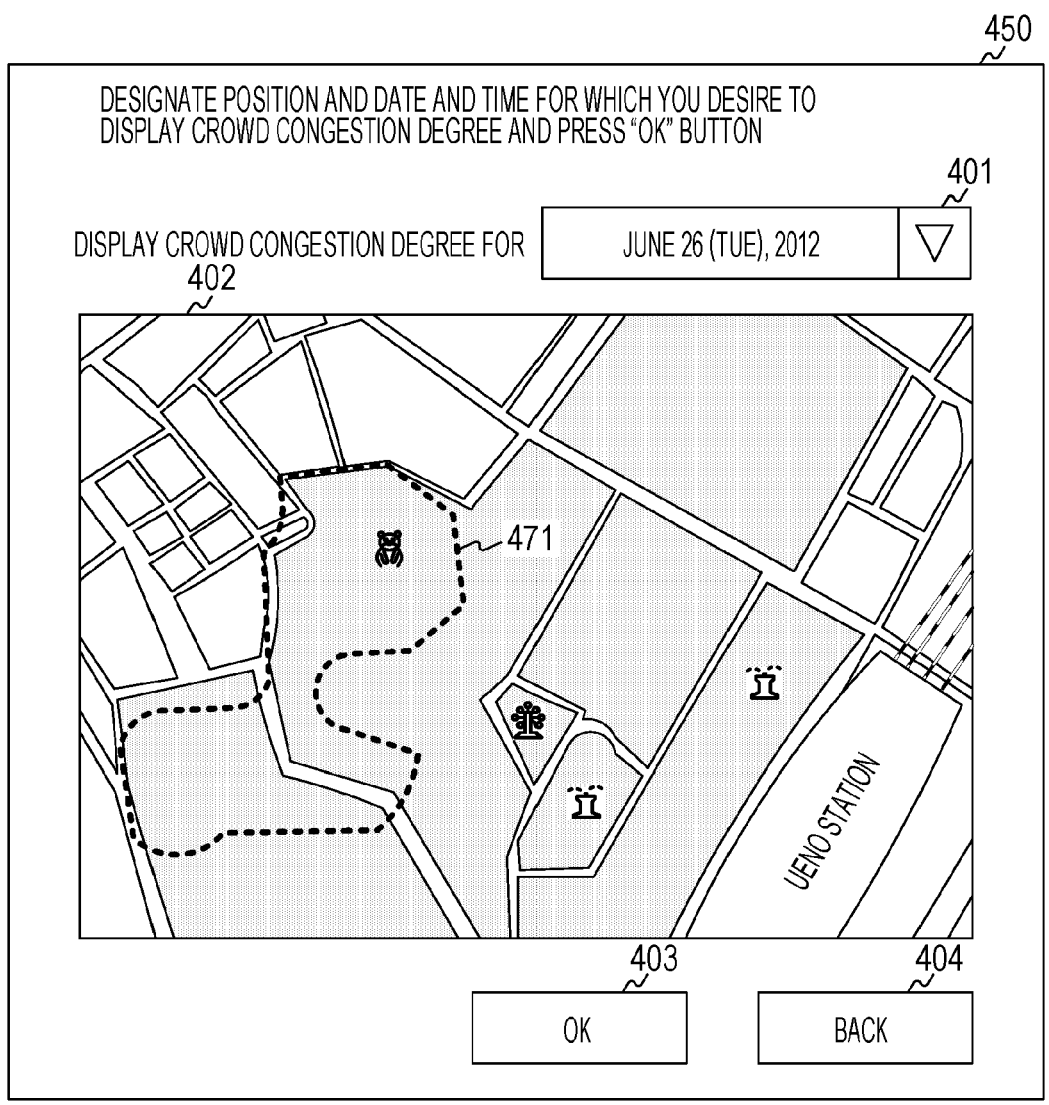
FIG. 18 illustrates a display screen example (the display screen) for designating a range and date and time for which the wireless communication apparatus in the first embodiment of the present technology displays congestion-degree information.

FIGS. 17A, 17B, and 18 illustrate a display screen example (a display screen 450) for designating a range and date and time for which the wireless communication apparatus 200 in the first embodiment of the present technology displays congestion-degree information. Since the display screen 450 illustrated in FIGS. 17A and 18 is a screen obtained by partly modifying the display screen 400 illustrated FIG. 11, portions that are the same as or similar to those of the display screen 400 are denoted by the same reference numerals and descriptions thereof are partly omitted.

The map-information designation region 402 in the display screen 450 is a region for designating a range for which the user desires display of the congestion-degree information. For example, the user can designate his or her desired range by performing a predetermined operation (e.g., a click operation using a mouse or a touch operation using a touch panel) on the map displayed in the map-information designation region 402.

For example, when a square is designated on a map as a range as illustrated in FIG. 17A, the user performs a designation operation (e.g., a click operation using the mouse or a touch operation using the touch panel) for designating four corners of the square. The square designated in such a manner is indicated by a thick line and the four corners of the square are indicated by white circles 451 to 454. When a designation operation is operated as described above, a display-information acquire request including latitudes and longitudes corresponding to the four corners of the square is transmitted from the wireless communication apparatus 200 to the information processing apparatus 300.

FIG. 17B illustrates a method for extracting base stations when the range is designated with the square illustrated in FIG. 17A. A latitude range of the square defined by the white circles 451 to 454 is indicated by A and a longitude range of the square is indicated by B.

For example, the display-information generator 360 extracts, from the congestion-degree information storage 340, base stations that are located in the range of the square defined by the white circle 451 to 454. For example, base stations 461 to 463 that are located in both of the latitude range A and the longitude range B are extracted. Base station 465 to 467 that are not located in the range of the square are not extracted.

Subsequently, on the basis of the congestion degrees for the extracted base stations, the display-information generator 360 can determine a congestion degree for the range (i.e., the square defined by the white circle 451 to 454) designated by the user. Since a method for the congestion degree determination is analogous to the above-described method for the congestion-degree determination using the congestion degrees of multiple base stations, a detailed description thereof is omitted hereinafter.

Although FIGS. 17A and 17B illustrate an example in which a range is designated with a square, any other designation method that can designate a latitude and a longitude may also be used for designating the range. For example, the range may be designated with a polygon, circle, ellipse, or the like. The wireless communication apparatus 200 may be adapted so that the range is designated with a trace operation by the user. An example of such designation is illustrated in FIG. 18.

FIG. 18 illustrates an example in which a range 471 is designated by a trace operation by the user. For example, when the user desires to know a congestion degree for a zoological park having a complicated topography, he or she can designate the range 471 (indicated by a dotted line) by tracing the outline of the zoological park. When a designation operation is performed in such a manner, a display-information acquire request including a latitude and a longitude for defining the designated range 471 is transmitted from the wireless communication apparatus 200 to the information processing apparatus 300.

2. Second Embodiment

A description in the first embodiment of the present technology has been given of an example in which transition of congestion degrees (crowd congestion degrees) in one day at a position designated by a user is displayed using a graph, signs, and so on. With respect to the crowd congestion degrees, many users may desire display of changes due to a day of the week or the season or changes from the previous day or the day before last, other than display of time-sequential changes in congestion degrees in one day.

Accordingly, a description in a second embodiment of the present technology will be given of an example in which crowd congestion degrees are displayed in various representations. A wireless communication apparatus and an information processing apparatus in the second embodiment of the present technology are partly modified versions of the wireless communication apparatus 200 and the information processing apparatus 300 illustrated in FIGS. 2 and 5 and so on. Thus, elements and portions that are the same as or similar to those in the wireless communication apparatus 200 and the information processing apparatus 300 are denoted by the same reference numerals and descriptions thereof are omitted hereinafter.

[Example of Determining Crowd Congestion Degree]

Figure 19:
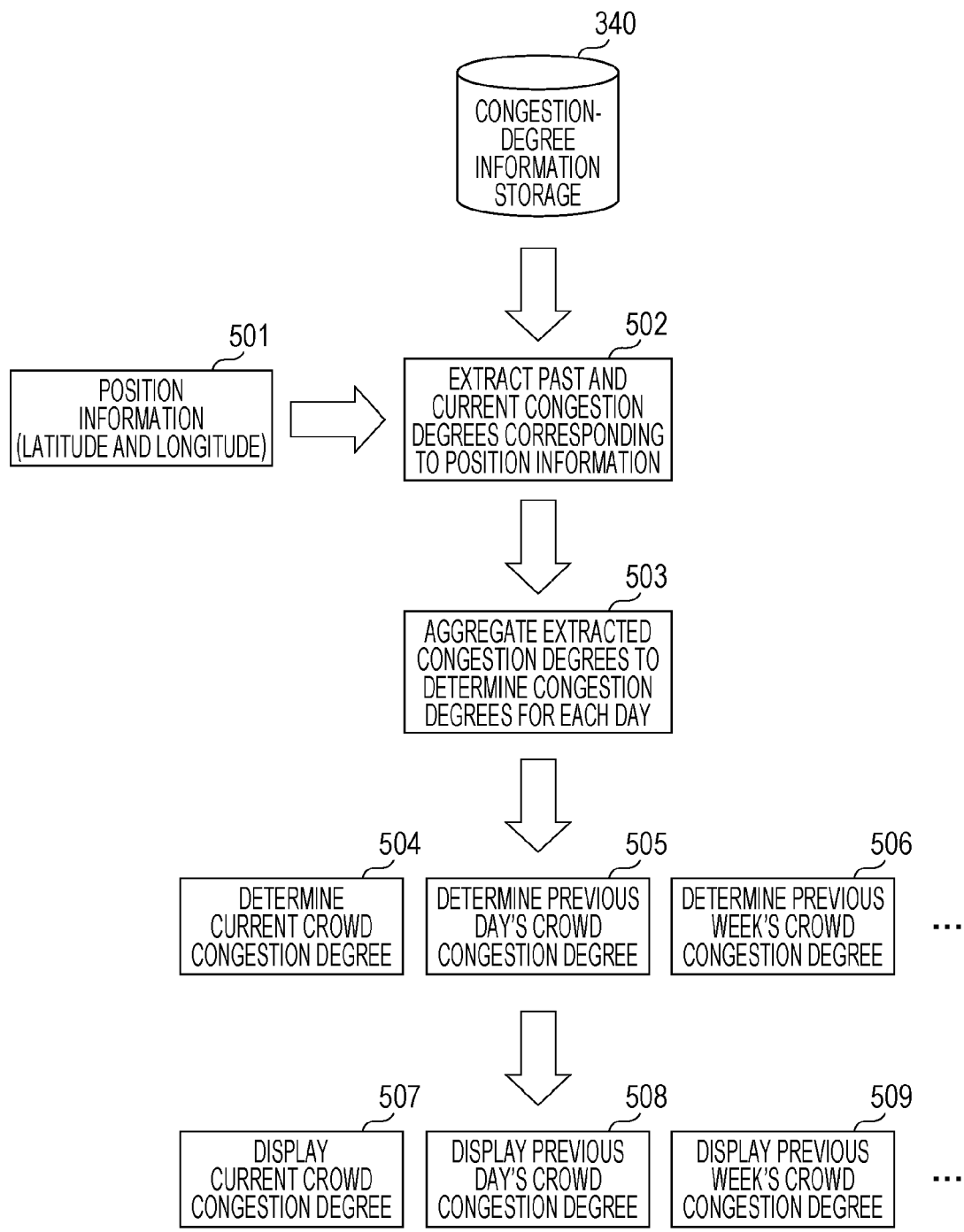
FIG. 19 is a diagram schematically illustrating a flow of crowd-congestion-degree determination made by the display-information generator in the second embodiment of the present technology.

FIG. 19 is a diagram schematically illustrating a flow of crowd-congestion-degree determination made by the display-information generator 360 in the second embodiment of the present technology. FIG. 19 illustrates an example for determining a current crowd congestion degree, the previous day's crowd congestion degree, the previous week's crowd congestion degree, and so on.

First, position information (e.g., a latitude and a longitude) regarding a place for which the user desires to know the crowd congestion degrees is input (501). For example, position information input at the wireless communication apparatus 200 is input to the display-information generator 360. Preset position information (e.g., a major tourist site in Tokyo) may be input to the display-information generator 360.

After the position information is input, the display-information generator 360 obtains, from the congestion-degree information storage 340, a congestion degree at the place corresponding to the input position information (502). In this case, past and current congestion degrees for the place corresponding to the input position information are obtained from congestion degrees stored in the congestion-degree information storage 340.

For example, Structured Query Language (SQL) is used to determine differences between the latitude and longitude corresponding to the input position information and the latitudes and longitudes corresponding to the congestion degrees stored in the congestion-degree information storage 340. Then, the base stations whose determined differences are close to zero are sequentially arranged and the congestion degrees for a predetermined number of top base stations (e.g., the top 1 to 5 base stations) are obtained.

Subsequently, the display-information generator 360 aggregates the obtained congestion degrees to determine congestion degrees for each day (503). In this case, only congestion degrees in a predetermined time slot in one day (e.g., the opening hours of the tourist site) may be aggregated. The congestion degrees for each day may also be determined using congestion degrees provided by multiple communication service providers, as appropriate.

Subsequently, on the basis of the determined congestion degree for each day, the display-information generator 360 determines crowd congestion degrees in a predetermined period of time (504 to 506). For example, a current crowd congestion degree is determined on the basis of the congestion degrees for the present day (504). Also, for example, the previous days' crowd congestion is determined on the basis of the congestion degrees for the previous day (505). Also, for example, the previous week's crowd congestion degree is determined on the basis of a total value of the congestion degrees for the previous week (506).

Although FIG. 19 illustrates only the current crowd congestion degree, the previous day's crowd congestion degree, and the previous week's crowd congestion degree, crowd congestion degrees for other periods of time (e.g., the day before yesterday, the week before last, the previous month, and the same day a year ago) may be determined.

A future crowd congestion degree may be predicted based on a past crowd congestion degree. For example, an average value of crowd congestion degrees for Wednesdays in a previous month is determined and the average value can be used to estimate a crowd congestion degree for Wednesday next week. For example, an average value of crowd congestion degrees for Wednesdays in the same period of the last year is determined and the average value can be used to estimate a crowd congestion degree for Wednesday next week. The method for the determination may be appropriately changed according to the place for which the congestion degree is to be determined.

Subsequently, the display-information generator 360 generates display information for displaying the determined crowd congestion degrees for the predetermined period. The controller 370 then causes the display information generated by the display-information generator 360 to be displayed on the display of the wireless communication apparatus (507 to 509). That is, the display information generated by the display-information generator 360 is transmitted to the wireless communication apparatus through wireless communication and is displayed on the display thereof. An example of such display information is illustrated in FIG. 20A.

Although FIG. 19 illustrates an example in which crowd congestion degrees in a predetermined period are displayed, the ratio of those values (e.g., the ratio of the current day's crowd congestion degree to the previous day's crowd congestion degree or the ratio of the current week's crowd congestion degree to the previous week's crowd congestion degree) may also be determined and displayed. For example, the ratio of the degree of current communication-traffic congestion in one area to the degree of communication-traffic congestion in the past in the area (e.g., the ratio of the current day's congestion degree to the previous day's congestion degree or the ratio of the current week's congestion degree to the previous week's congestion degree) can be determined and displayed. The ratio of the degree of communication-traffic congestion at one time point in the past in one area to the degree of communication-traffic congestion at another time point in the past in the area (e.g., the ratio of a congestion degree in August of last year to a congestion degree in August of the year before last) can be determined and displayed. For example, the ratio of the current day's congestion degree to the previous day's congestion degree can be determined by dividing the crowd congestion degree in the current day by the crowd congestion degree in the previous day. For example, the ratio of the current week's congestion degree to the previous week's congestion degree can be determined by dividing the crowd congestion degree in this week by the crowd congestion degree in the previous week. For example, the ratio of a crowd congestion degree in August of last year to a crowd congestion degree in August of the year before last can be determined by dividing the crowd congestion degree in August of last year by the crowd congestion degree in August of the year before last. A display example of such congestion degrees is displayed in FIG. 20B.

[Example of Display of Congestion-Degree Information]

FIGS. 20A and 20B illustrate examples of a display screen displayed on the wireless communication apparatus 200 in the second embodiment of the present technology.

FIGS. 20A and 20B illustrate examples in which major tourist sites are registered and congestion degrees at each tourist site are displayed based on the registration. More specifically, FIGS. 20A and 20B illustrate examples in which major tourist sites (i.e., zoological parks, amusement parks, and a park) in Tokyo are registered and congestion degrees at each tourist site are displayed based on the registration. For example, the major tourist sites can be registered by associating information (e.g., position information, area information, and names) regarding the tourist sites with the map information stored in the map-information storage 350.

FIG. 20A illustrates an example in which current crowd congestion degrees, yesterday's crowd congestion degrees, and the last week's crowd congestion degrees are displayed. FIG. 20B illustrates an example in which the ratios of today's crowd congestion degree to yesterday's crowd congestion degrees and the ratios of this week's crowd congestion degrees to the last week's crowd congestion degrees are displayed in conjunction with the current crowd congestion degrees.

For example, the user uses the operation receiver 260 of the wireless communication apparatus 200 to perform, on the map of Japan, a designation operation by which the user designates a prefecture he or she desires to display. A congestion-degree-information acquire request including information regarding a prefecture (e.g., Tokyo) designated by the designation operation is transmitted to the information processing apparatus 300. In response to the congestion-degree-information acquire request, the information processing apparatus 300 transmits, to the wireless communication apparatus 200, display information to be displayed on the display screen illustrated in FIG. 20A or 20B.

For example, as illustrated in FIGS. 20A and 20B, signs (e.g., icons and symbols) indicating major tourist sites in Tokyo are displayed at places where the tourist sites are located. Congestion-degree information for each tourist site is displayed in the vicinity of the sign indicating the tourist site. For example, the congestion-degree information is displayed in a corresponding callout. FIGS. 20A and 20B illustrate examples in which only some of the tourist sites in Tokyo are displayed for ease of description. In this case, if all tourist sites are displayed, the number of signs indicating the tourist sites and the number of pieces of congestion-degree information increase, which may make it difficult to view. Accordingly, the arrangement may be such that a tourist site to be displayed can be selected by a user operation. An example of such an arrangement is illustrated in FIGS. 21 to 25.

[Example of Designating Display Details of Congestion-Degree Information]

FIGS. 21 to 25 illustrate an example of transition of a display screen (a display screen 520) for designating display details of congestion-degree information through use of the wireless communication apparatus 200 in the second embodiment of the present technology. In FIGS. 21 to 25, a map and signs indicating tourist sites are analogous to those in FIGS. 20A and 20B.

The display screen 520 has a congestion-degree information designation region 521, a map display region 522, an "OK" button 524, and a "back" button 525.

The congestion-degree information designation region 521 is a region for designating display details of the congestion-degree information. In this example, it is possible to designate either "Display Current Crowd Congestion Degree, Yesterday's Crowd Congestion Degree, and Last Week's Crowd Congestion Degree" or "Display Current Crowd Congestion Degree, Ratio of Crowd Congestion Degree to Yesterday's Crowd Congestion Degree, and Ratio of Crowd Congestion Degree to Last Week's Crowd Congestion Degree". For example, desired display details can be designated by a pressing operation performed by the user or a pressing operation using a cursor 530.

The map display region 522 is a region in which a map (e.g., for each prefecture or for each municipality) designated by the user and a tourist-site designation region 523 are displayed. The tourist-site designation region 523 is a region for designating a tourist site for which the congestion-degree information is to be displayed. In this example, at least one of the major tourist sites (the zoological parks, amusement parks, and parts) illustrated in FIGS. 20A and 20B is designated. For example, a desired tourist site can be designated by a pressing operation performed by the user or a pressing operation using the cursor 530.

The "OK" button 524 is pressed for confirming the tourist site and congestion-degree information display details designated by the user.

The "back" button 525 is pressed for returning the display screen displayed on the display 280 to an immediately preceding screen.

Figure 22:
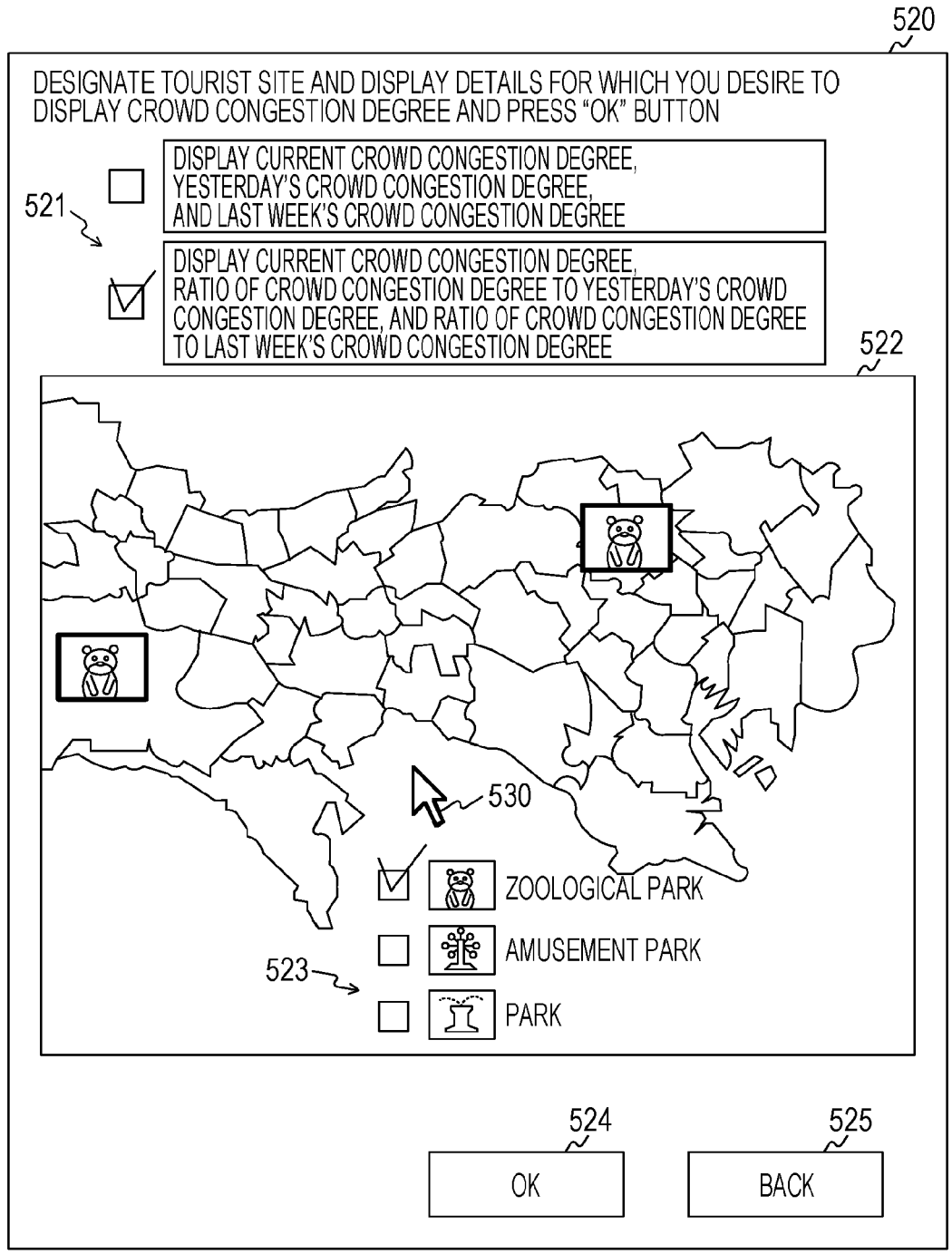
FIG. 22 illustrates an example of transition of the display screen (the display screen) for designating display details of congestion-degree information through use of the wireless communication apparatus in the second embodiment of the present technology.
Figure 23:
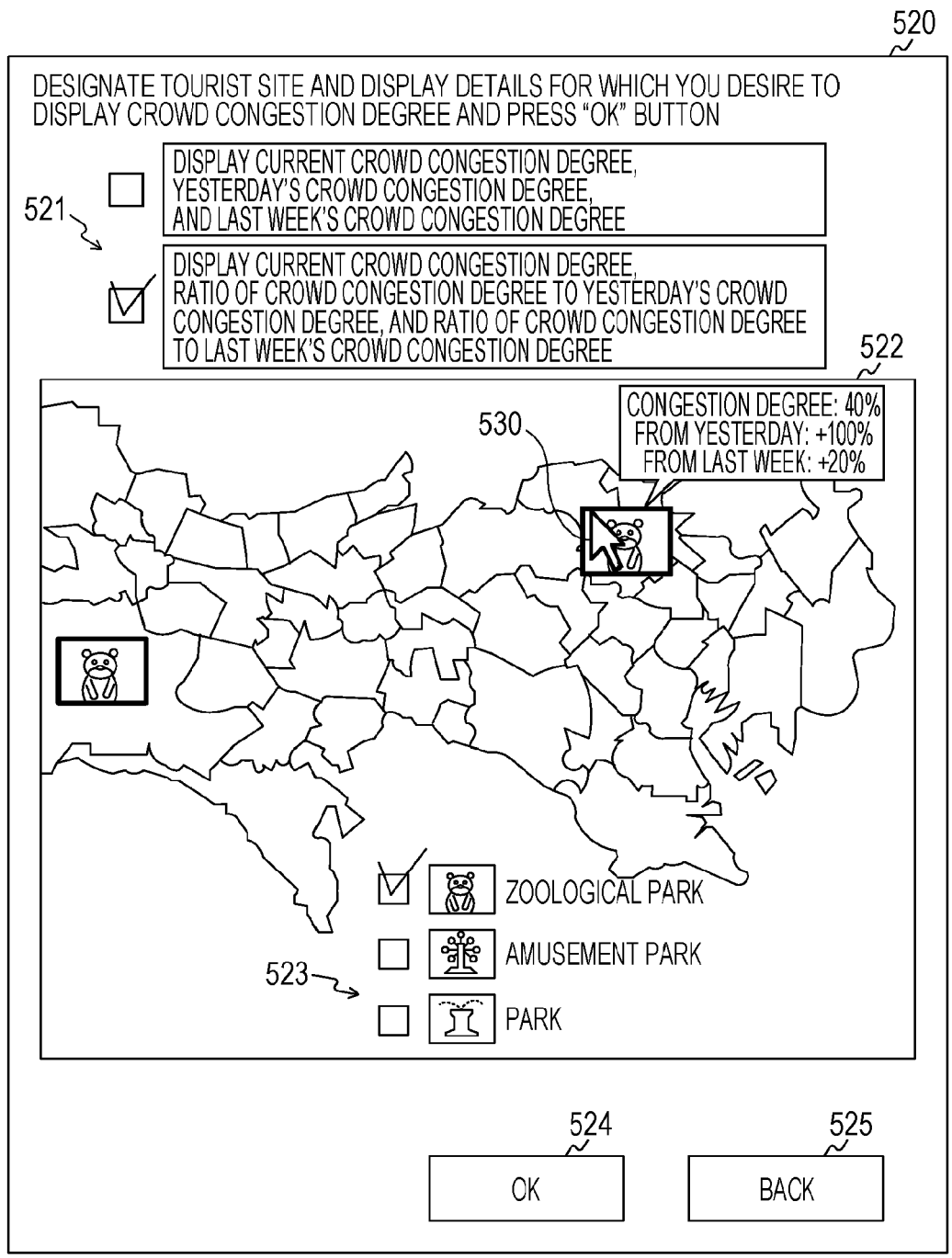
FIG. 23 illustrates an example of transition of the display screen (the display screen) for designating display details of congestion-degree information through use of the wireless communication apparatus in the second embodiment of the present technology.
Figure 24:
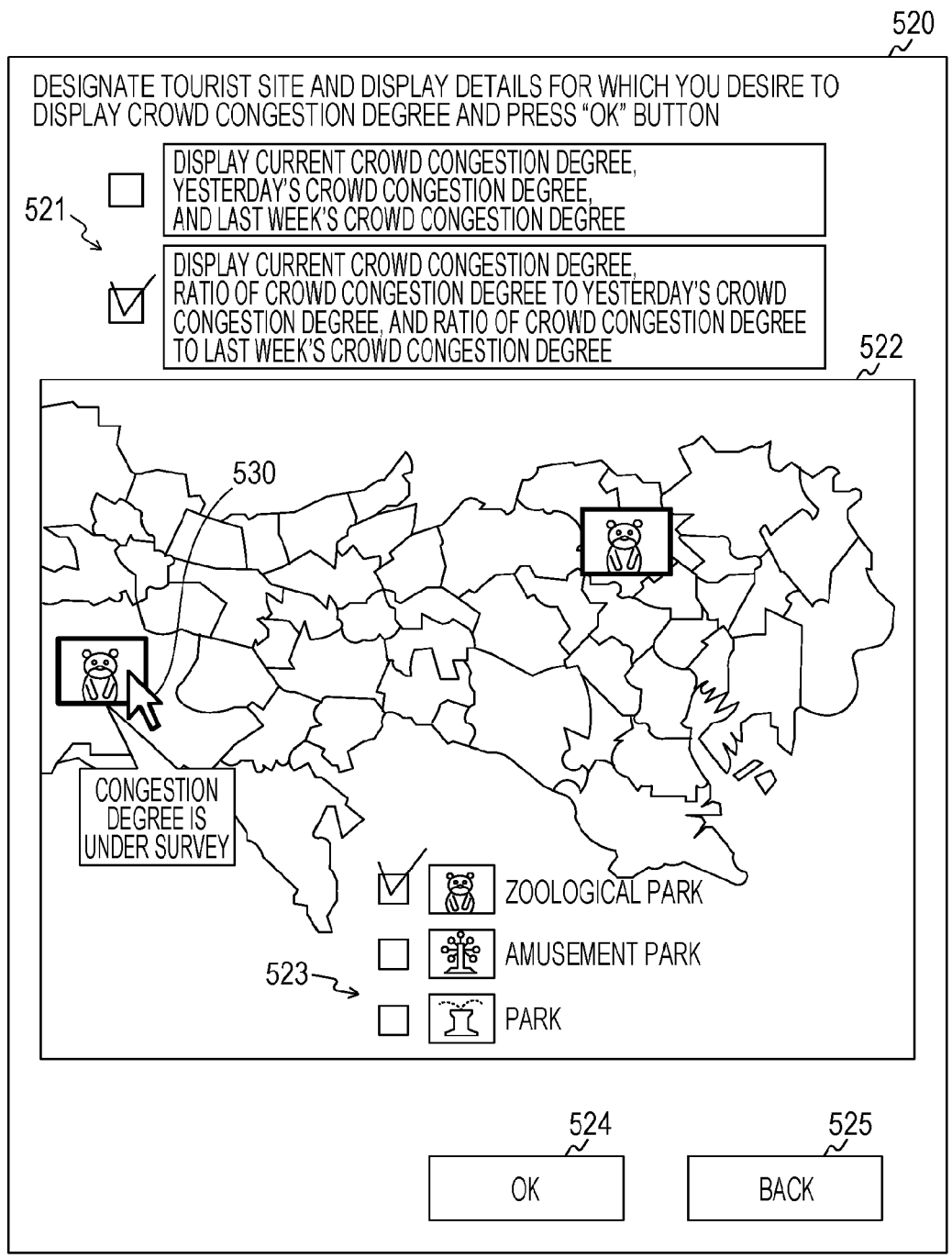
FIG. 24 illustrates an example of transition of the display screen (the display screen) for designating display details of congestion-degree information through use of the wireless communication apparatus in the second embodiment of the present technology.
Figure 25:
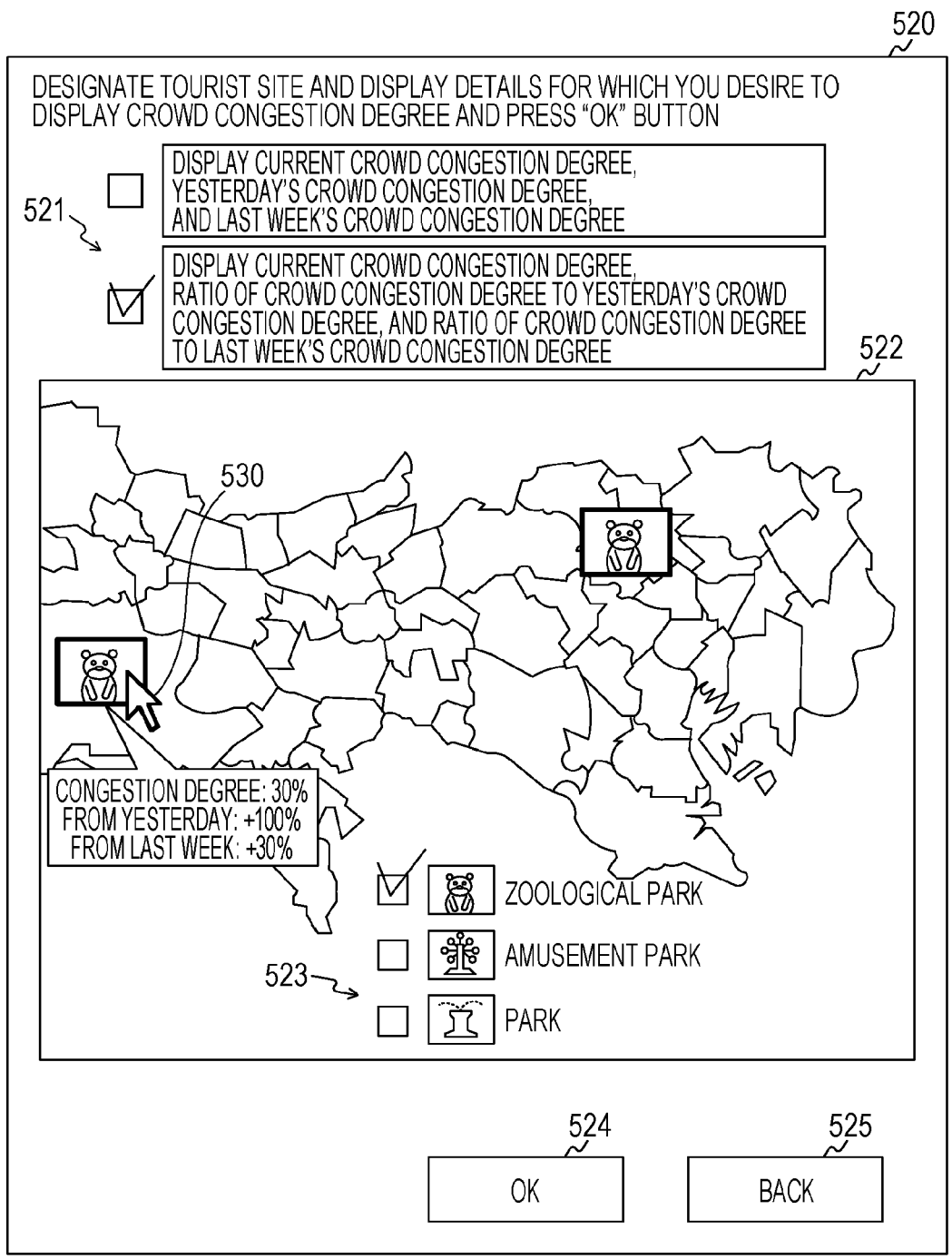
FIG. 25 illustrates an example of transition of the display screen (the display screen) for designating display details of congestion-degree information through use of the wireless communication apparatus in the second embodiment of the present technology.

FIGS. 23 to 25 illustrate display examples when "Display Current Crowd Congestion Degree, Ratio of Crowd Congestion Degree to Yesterday's Crowd Congestion Degree, and Ratio of Crowd Congestion Degree to Last Week's Crowd Congestion Degree" is designated in the congestion-degree information designation region 521 and the zoological park is designated in the tourist-site designation region 523, as illustrated in FIG. 22.

When a designation operation is performed as illustrated in FIG. 22, a sign indicating the tourist site designated in the tourist-site designation region 523 is displayed on the map in the map display region 522. For example, two signs indicating zoological parks are displayed on the map in the map display region 522.

When the user desires to know the congestion degree of one of two zoological parks, he or she performs a designation operation (e.g., a pressing operation) for designating the sign indicating the zoological park for which he or she desires to know the congestion degree. For example, it is possible to designate a desired one of the desired zoological parks by a pressing operation by the user or by a pressing operation using the cursor 530. FIG. 23 illustrates a display example when the zoological park at the right side on the map in the map display region 522 is designated. FIGS. 24 and 25 illustrate display examples when the zoological park at the left side on the map in the map display region 522 is designated.

For example, when the processing for a designation operation at the information processing apparatus 300 is not completed after the user performs the designation operation for the sign indicating the zoological park, a message showing that the congestion degree is under survey is displayed as illustrated in FIG. 24. When the processing for the designation operation is completed at the information processing apparatus 300, the congestion-degree information is displayed as illustrated in FIG. 25.

Displaying only the congestion-degree information for a tourist site desired by the user, as described above, makes it possible to reduce the amount of search processing and the amount of calculation processing performed by the information processing apparatus 300. It is also possible to quickly display the congestion-degree information for the tourist site desired by the user. In addition, since only the congestion-degree information for the tourist site desired by the user is displayed, it is easier for the user to view the congestion-degree information.

[Example of Area Registration]

Now, a description will be given of a case in which congestion-degree information for a place other than registered tourist sites is displayed. In this case, for example, the latitude and longitude of the place and the number of base stations from which congestion-degree information is to be determined are registered in advance. For example, when the place for which the user desires to display the congestion-degree information is an airport (e.g., Haneda Airport), five base stations in order of increasing distance from a place to be registered (e.g., an administration building) are selected as base stations for which the congestion-degree information is to be determined, since the area of the airport is large. As described in the first embodiment of the present technology, the arrangement may be such that the user designates a range for which the congestion-degree information is to be determined and the range is registered.

For example, each tourist site crowded with people is in many cases covered by two or three base stations, since the area of the tourist site is large and the communication capacity for the area is large. For example, although the area of each transfer station in the Tokyo metropolitan area is small, base stations therefor are in many cases subdivided (segmented) into microcells in order to increase the communication capacity. Accordingly, for example, at a transfer station in the Tokyo metropolitan area, the station is also covered by two or three base stations in many cases.

Thus, since base stations are installed based on the number of people in a crowd, utilization of the location of the base stations makes it possible to increase the number of points for detecting crowd congestion degrees to thereby increase the accuracy thereof.

Figure 26A:
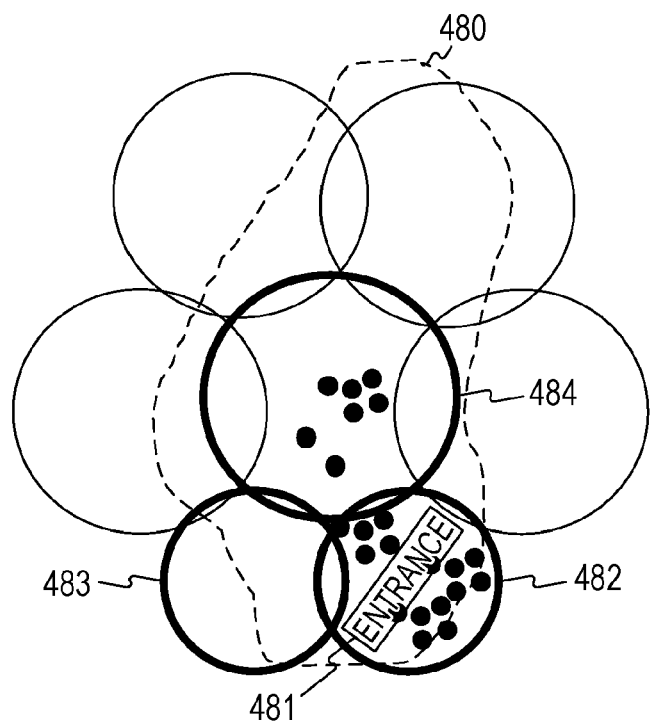
FIGS. 26A and 26B illustrate examples of areas registered in the information processing apparatus in the second embodiment of the present technology.
Figure 26B:
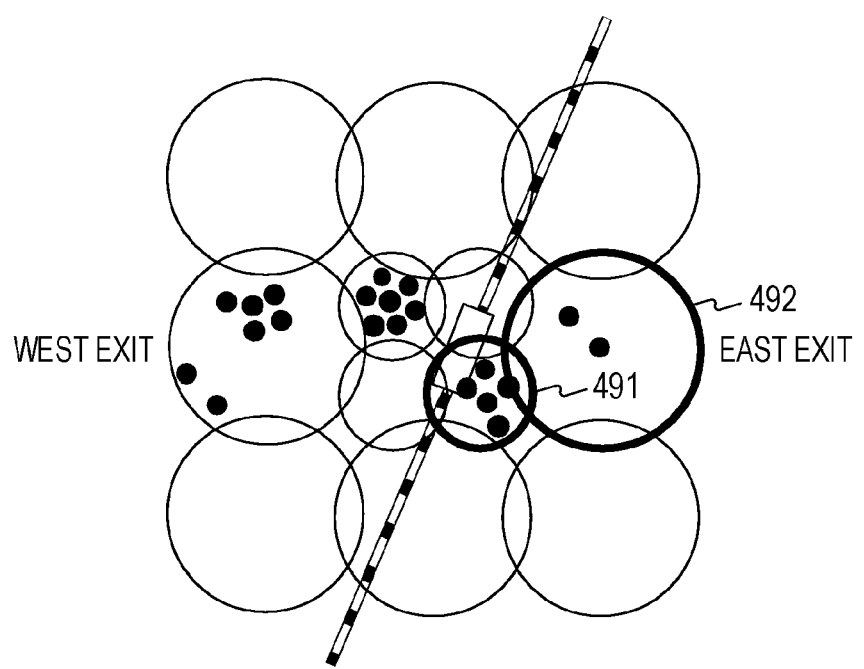

FIGS. 26A and 26B illustrate examples of areas registered in the information processing apparatus 300 in the second embodiment of the present technology. FIG. 26A illustrates an amusement park 480 and FIG. 26B illustrates the vicinity of a station.

For example, with respect to a vast tourist site or the like, congestion degrees regarding base stations (e.g., two or three base stations) for only the vicinity of a main entrance or building may be used without use of congestion degrees regarding many base stations (e.g., five or six base stations). For example, of cells 482 to 484 illustrated in FIG. 26A, one cell desired by the user can be registered in association with the amusement park 480.

For a transfer station in the Tokyo metropolitan area, for example, rather than increasing the accuracy of the congestion degree at the station by using microcell stations, for example, a congestion degree for the east exit, the west exit, or the like of the station may be detected using only the congestion degree of one base station without determining an average value. For example, of cells 491 and 492 illustrated in FIG. 26B, one cell desired by the user can be registered in association with the east exit of the station.

[Example of Operation of Information Processing Apparatus]

Figure 27:
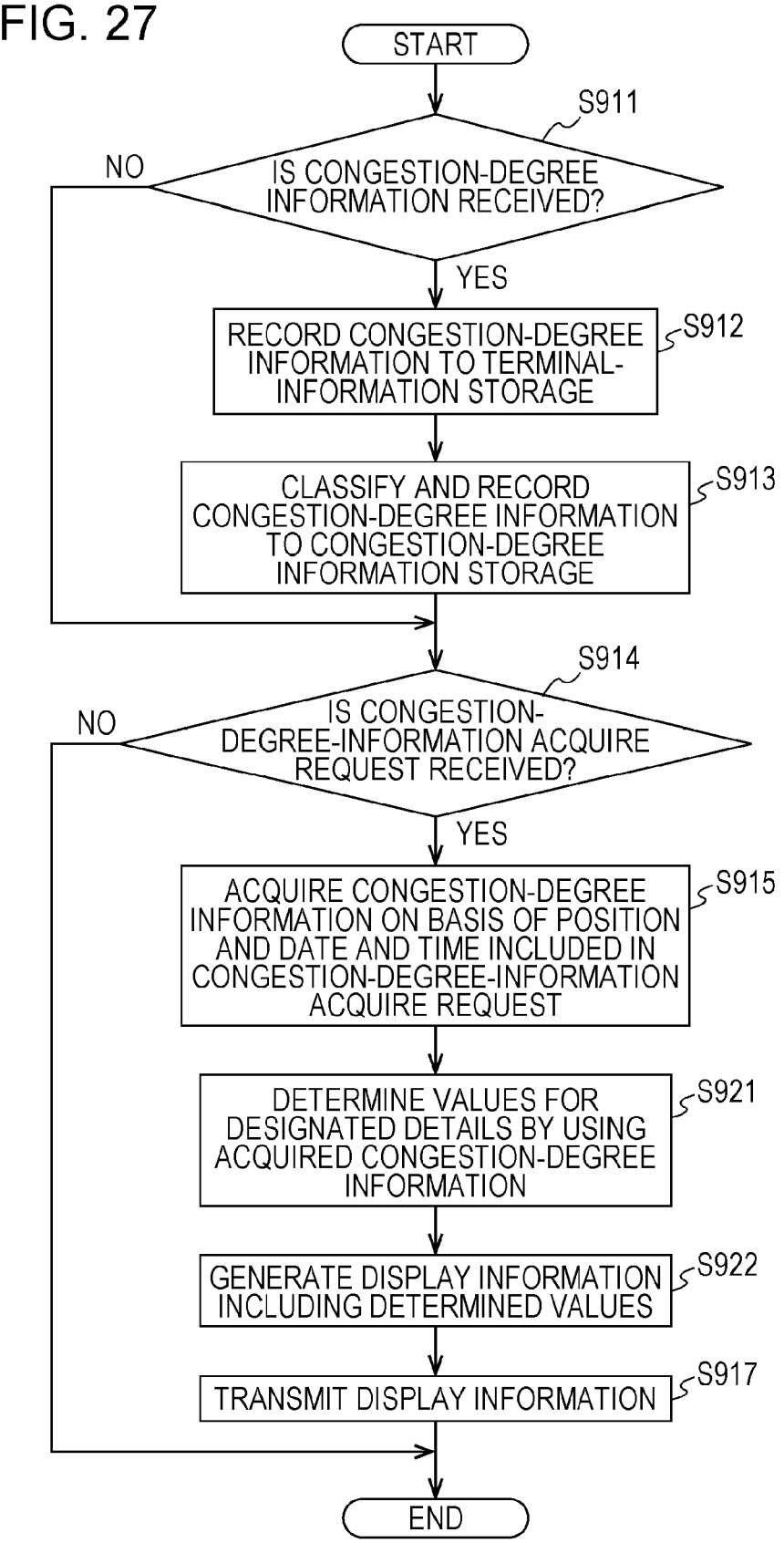
FIG. 27 is a flowchart illustrating one example of a process of congestion-degree-information providing processing performed by the information processing apparatus in the second embodiment of the present technology.

FIG. 27 is a flowchart illustrating one example of a process of congestion-degree-information providing processing performed by the information processing apparatus 300 in the second embodiment of the present technology. Since the flowchart in FIG. 27 is a modification of FIG. 13, portions that are the same as or similar to those in FIG. 13 are denoted by the same reference numerals and descriptions thereof are partly omitted hereinafter.

When a congestion-degree-information acquire request is received in step S914, the process proceeds to step S915 in which the display-information generator 360 acquires, from the congestion-degree information storage 340, congestion-degree information corresponding to the position and the date and time included in the congestion-degree-information acquire request. The congestion-degree-information acquire request includes details designated in the congestion-degree information designation region 521 and the map display region 522 illustrated in FIG. 21.

Subsequently, in step S921, by using the acquired congestion-degree information, the display-information generator 360 determines values for the designated details. For example, when "Display Current Crowd Congestion Degree, Yesterday's Crowd Congestion Degree, and Last Week's Crowd Congestion Degree" is designated in the congestion-degree information designation region 521, the values for the position designated in the map display region 522 are determined. On the other hand, when "Display Current Crowd Congestion Degree, Ratio of Crowd Congestion Degree to Yesterday's Crowd Congestion Degree, and Ratio of Crowd Congestion Degree to Last Week's Crowd Congestion Degree" is designated, the values of the ratios for the position designated in the map display region 522 are determined.

Subsequently, in step S922, the display-information generator 360 generates display information (including the determined values) for causing the wireless communication apparatus that transmitted the congestion-degree-information acquire request to display the congestion degrees.

As described above, the communicator 310 in the information processing apparatus 300 receives the congestion-degree-information acquire request (designation information) for an area determined by a designation operation by which the user designates a position and a range on a map displayed on the display 280 of the wireless communication apparatus 200.

The controller 370 performs control for causing at least one of the degree of communication-traffic congestion in the area and the sign indicating the congestion degree to be displayed on the display 280 as an index for the area. For example, the controller 370 performs control to cause at least one of the degree of communication-traffic congestion in the area and the sign indicating the congestion degree to be displayed on the display 280 in association with a map including the area.

Thus, since tendencies or changes in the congestion degree which are due to time, a day of the week, or the season are often desired rather than the actual numeric values of the congestion degrees, those pieces of information may be appropriately provided in accordance with users' designation.

Transitions of congestion of use of social infrastructures (railroads, roads, tourist sites, and so on) are also important information even for users who construct the infrastructures. In general, for tourist sites where people gather, crowd-congestion-degree data for any changes with time, such as differences between daytime hours, differences between a weekday and a weekend, and differences due to a season, are collected and analyzed in many cases. Those pieces of data are also disclosed to the public in many cases.

However, collecting crowd data and checking transition of the data takes a large amount of time and a lot of work hours and, thus, is not easily performed in many cases. Thus, in general, analysis of crowd congestion degrees is in many cases limited to each tourist site and information collection and disclosure of crowd congestion degrees for a large area are rarely performed.

In contrast, in the embodiment of the present technology, the presence of most of people having wireless communication apparatuses (e.g., mobile phones) can be easily compiled into a database as a cardinal number with respect to any communication service provider, so that the state of congestion degrees and the transition thereof can be easily grasped. Thus, in the embodiment of the present technology, without handling the position of each individual person, the positions of people (i.e., the positions of wireless communication apparatuses) that already constitute a cardinal number and communications-channel congestion degrees that are irrelevant to the number of people are measured and the values of the measurements are obtained by the information processing apparatus 300. The information processing apparatus 300 then determines crowd congestion degrees. With this arrangement, the crowd congestion degrees can be easily collected and presented to users without almost no privacy issues.

Under the present situation in which mobile terminals are in widespread use, crowd congestion degrees in regions around the world, in all time zones, and in all seasons and transitions of the crowd congestion degrees can be easily grasped and the information useful in social activities can be easily presented to users.

In addition, the state of crowd congestions in specific areas such as tourist sites, transition of crowd congestion degrees, and so on can be easily displayed on a map. As a result, the user can quickly view the easy-to-view congestion-degree information. That is, in the embodiments of the present technology, transition information of congestion degrees at a specific place can easily be obtained based on the degrees of communication-traffic congestion and can easily be displayed on a map.

In the embodiments of the present technology, the number of people at the place and transition of the number of people are simply grasped as simple statistical data. Such data (e.g., statistical data of people or statistical data resulting from differences in preference of people) may also be called "collective knowledge". Such data may also be newly defined as a cardinal number. Since the cardinal number does not reflect personal attributes and intensions, it is possible to significantly reduce the hurdle in privacy issues.

The embodiments of the present technology are applicable to other mobile wireless communication apparatuses (e.g., terminal apparatuses dedicated to data communication) and stationary wireless communication apparatuses (e.g., personal computers with wireless communication functions).

The descriptions in the embodiments of the present technology have been given of examples in which the congestion-degree information is displayed on the display of the wireless communication apparatus. However, for example, the congestion-degree information may be output from a sound output unit (e.g., a speaker) of the wireless communication apparatus. Electronic equipment (e.g., an external sound-output device or an external display device) connected to the wireless communication apparatus may be adapted to output the congestion-degree information. In such a case, the congestion-degree information is transmitted from the wireless communication apparatus to the electronic equipment and the congestion-degree information is then output from the electronic equipment.

The above descriptions in the embodiments of the present technology have been given of examples in which the congestion-degree information is output (for display or as sound) from the wireless communication apparatus. However, for example, the congestion-degree information may also be output from an information processing apparatus (e.g., a server). Electronic equipment (e.g., an external sound-output device or an external display device) connected to the information processing apparatus in a wired or wireless manner may also be adapted to output the congestion-degree information. In such a case, the congestion-degree information is transmitted from the information processing apparatus to the electronic equipment and the congestion-degree information is then output from the electronic equipment.

The above-described embodiments are merely examples for embodying the present technology, and the matters in the embodiments and the present-technology defining matters in the appended claims have associations therebetween. Similarly, the present-technology defining matters in the claims and the matters that are disclosed in the embodiments of the present technology and that are given the same names as those of the present-technology defining matters have associations therebetween. The present technology, however, is not limited to the above-described particular embodiments and can be embodied by making various changes and modifications thereto without departing from the spirit and scope of the present technology.

The processes described in the above embodiments may be regarded as a method having a series of steps, as a program for causing a computer to execute the series of steps, or as a recording medium storing the program. Examples of the recording medium include a compact disc (CD), a MiniDisc (MD), a DVD, a memory card, and a Blu-ray Disc (registered trademark).

The present technology can also provide the following configuration.

(1) An information processing apparatus including:
a receiver configured to receive designation information corresponding to a user operation for designating an area for which an index indicating a degree of human congestion is to be displayed; and
a controller configured to perform control to provide a degree of communication traffic in the area as the index for the area.

(2) The information processing apparatus according to (1), wherein the receiver receives the designation information regarding the area determined by a designation operation by which a user designates a position and a range on a map displayed on a display of a wireless communication apparatus, and
the information processing apparatus further includes a determiner configured to extract at least one base station located in the area and determine the degree of communication-traffic congestion in the area on the basis of a communication-traffic congestion degree regarding the extracted base station.

(3) The information processing apparatus according to (2), wherein the determiner uses a communication-traffic congestion degree obtained by at least one wireless communication apparatus present in the area as the communication-traffic congestion degree regarding the extracted base station.

(4) The information processing apparatus according to (3), wherein the determiner determines the degree of communication-traffic congestion in the area by averaging the communication-traffic congestion degrees obtained by the at least one wireless communication apparatus present in the area.

(5) The information processing apparatus according to (3), wherein the determiner aggregates, at predetermined intervals, the communication-traffic congestion degrees obtained by the at least one wireless communication apparatus present in the area, to determine at least one of a degree of current communication-traffic congestion in the area and a degree of communication-traffic congestion in the past in the area.

(6) The information processing apparatus according to (5), wherein the determiner determines a ratio of the degree of current communication-traffic congestion in the area to the degree of communication-traffic congestion in the past in the area as the index for the area.

(7) The information processing apparatus according to (5), wherein the determiner determines a ratio of the degree of communication-traffic congestion at one time point in the past in the area to the degree of communication-traffic congestion at another time point in the past in the area as the index for the area.

(8) The information processing apparatus according to one of (1) to (4), wherein the designation information includes date-and-time information, and
the controller performs control to provide, as the index for the area, the degree of communication-traffic congestion in the area in a period specified by the date-and-time information.

(9) The information processing apparatus according to (1) to (8), wherein the controller performs control to cause at least one of the degree of communication-traffic congestion in the area and a sign indicating the degree of communication-traffic congestion to be displayed on a display as the index for the area.

(10) The information processing apparatus according to (9), wherein the controller performs control to cause at least one of the degree of communication-traffic congestion in the area and a sign indicating the degree of communication-traffic congestion to be displayed on the display in association with a map including the area.

(11) The information processing apparatus according to (10), wherein the controller performs control to cause at least one of the degree of communication-traffic congestion in the area and a sign indicating the degree of communication-traffic congestion to be displayed on the display in a superimposed manner on the map.

(12) A communication system including:
a wireless communication apparatus configured to transmit, on the basis of a user operation for designating an area for which an index indicating a degree of human congestion is to be displayed, designation information regarding the area to an information processing apparatus; and
an information processing apparatus that includes
a receiver that receives the designation information, and
a controller that performs control to cause the wireless communication apparatus to display a degree of communication-traffic congestion in the area as the index for the area.

(13) An information processing method including:
receiving designation information corresponding to a user operation for designating an area for which an index indicating a degree of human congestion is to be displayed; and
performing control to provide a degree of communication traffic in the area as the index for the area.

The present disclosure contains subject matter related to that disclosed in Japanese Priority Patent Application JP 2012-158264 filed in the Japan Patent Office on Jul. 17, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a receiver configured to receive designation information corresponding to a user operation, the designation information designating a geographic area for which an index indicating a degree of human congestion in the geographic area is to be determined; and
a controller configured to, in response to receipt of the designation information, determine the index indicating the degree of human congestion by:
determining a degree of wireless communication traffic in the geographic area; and
evaluating the degree of wireless communication traffic in the geographic area to produce the index indicating the degree of human congestion in the geographic area,
wherein a ratio of a degree of current wireless communication traffic to the degree of wireless communication traffic in the past in the geographic area is determined as the index for the geographic area and
wherein the degree of wireless communication traffic is a ratio of a smallest correlation output for a scrambling code to a highest correlation output for another scrambling code in code division multiple access (CDMA) communication.

2. The information processing apparatus according to claim 1, wherein the receiver receives the designation information regarding the geographic area by receiving a position and a range designated by a user on a map displayed on a display of a wireless communication apparatus, and
wherein the controller is configured to determine the degree of wireless communication traffic in the geographic area by:
identifying, from an evaluation of wireless communication traffic in the geographic area, at least one wireless base station located in the geographic area; and
determining a communication-traffic congestion degree regarding each of the at least one wireless base station.

3. The information processing apparatus according to claim 2, wherein for a first wireless base station of the at least one wireless base station, the controller determines a first communication-traffic congestion degree for the first wireless base station by receiving the first communication-traffic congestion degree for the first wireless base station from at least one wireless communication apparatus present in the geographic area.

4. The information processing apparatus according to claim 3, wherein the controller is configured to:
receive the communication-traffic congestion degree for each wireless base station from the at least one wireless communication apparatus present in the geographic area; and
determine the degree of wireless communication traffic in the geographic area by averaging the communication-traffic congestion degrees for the at least one wireless base station received from the at least one wireless communication apparatus present in the geographic area.

5. The information processing apparatus according to claim 3, wherein the controller is configured to determine the degree of wireless communication traffic in the geographic area by:
receiving, at predetermined intervals over time, communication-traffic congestion degrees for the at least one wireless base station from the at least one wireless communication apparatus present in the geographic area, and
evaluating the communication-traffic congestion degrees received over time to determine a current degree of wireless communication traffic in the geographic area and/or a prior degree of wireless communication traffic in the geographic area.

6. The information processing apparatus according to claim 5, wherein the controller is configured to evaluate the degree of wireless communication traffic in the geographic area to produce the index indicating the degree of human congestion by calculating a ratio of a first prior degree of wireless communication traffic for one time point in the past in the geographic area to a second degree of wireless communication traffic at another time point in the past in the geographic area.

7. The information processing apparatus according to claim 1, wherein the designation information includes date-and-time information, and
the controller is configured to determine the index indicating the degree of human congestion in the geographic area in the period specified by the date-and-time information.

8. The information processing apparatus according to claim 1, wherein the controller triggers display of the degree of wireless communication traffic in the geographic area and/or a graphic indicating the degree of wireless communication traffic as the index for the geographic area.

9. The information processing apparatus according to claim 8, wherein the controller triggers the display of the degree of wireless communication traffic in the geographic area and/or the graphic indicating the degree of wireless communication traffic in the geographic area in association with a map including the geographic area.

10. The information processing apparatus according to claim 9, wherein the controller triggers the display of the degree of wireless communication traffic in the geographic area and/or the graphic indicating the degree of wireless communication traffic in a superimposed manner on the map.

11. A communication system comprising:
a wireless communication apparatus configured to transmit, in response to a user operation designating a geographic area for which an index indicating human congestion in the geographic area is to be determined, designation information regarding the geographic area; and
an information processing apparatus comprising:
a transceiver configured to receive the designation information from the wireless communication apparatus and to transmit information indicative of the index of human congestion to the wireless communication apparatus, and
a controller configured to, in response to receipt of the designation information,
determine the index indicating human congestion by:
determining a degree of wireless communication traffic in the geographic area; and
evaluating the degree of wireless communication traffic in the geographic area to produce the index indicating human congestion in the geographic area,
wherein a ratio of a degree of current wireless communication traffic to the degree of wireless communication traffic in the past in the geographic area is determined as the index for the geographic area and wherein the degree of wireless communication traffic is a ratio of a smallest correlation output for a scrambling code to a highest correlation output for another scrambling code in code division multiple access (CDMA) communication.

12. An information processing method comprising:
receiving, from a wireless communication apparatus, designation information designating an area for which an index indicating human congestion in the area is to be determined; and
in response to receiving the designation information:
determining a degree of wireless communication traffic in the area; and
evaluating the degree of wireless communication traffic in the area to produce the index indicating human congestion in the area,
wherein a ratio of a degree of current wireless communication traffic to the degree of wireless communication traffic in the past in the area is determined as the index for the area and wherein the degree of wireless communication traffic is a ratio of a smallest correlation output for a scrambling code to a highest correlation output for another scrambling code in code division multiple access (CDMA) communication.

* * * * *